(12) United States Patent
Moran et al.

(10) Patent No.: US 7,742,999 B2
(45) Date of Patent: Jun. 22, 2010

(54) HELP CENTER AND PRINT CENTER APPLICATIONS

(75) Inventors: James R. Moran, Leesburg, VA (US); Gail Haddock, Haymarket, VA (US); Greg Weston Smith, Warrenton, VA (US); Todd Brannam, Alexandria, VA (US)

(73) Assignee: AOL Inc., Dulles, VA (US)

( * ) Notice: Subject to any disclaimer, the term of this patent is extended or adjusted under 35 U.S.C. 154(b) by 2106 days.

(21) Appl. No.: 10/134,680

(22) Filed: Apr. 30, 2002

(65) Prior Publication Data

US 2003/0084335 A1    May 1, 2003

Related U.S. Application Data

(60) Provisional application No. 60/330,590, filed on Oct. 25, 2001.

(51) Int. Cl.
G06F 17/60 (2006.01)
G06F 3/00 (2006.01)
G06F 9/44 (2006.01)
G03G 15/00 (2006.01)

(52) U.S. Cl. .................. 705/346; 715/707; 715/733; 715/168; 715/708; 715/710; 715/704; 705/8; 705/14.4; 705/26; 705/1.1; 705/305; 705/304; 399/10; 399/8; 399/12

(58) Field of Classification Search .................. None
See application file for complete search history.

(56) References Cited

U.S. PATENT DOCUMENTS

| | | |
|---|---|---|
| 4,457,076 A | 7/1984 | Heck |
| 4,680,781 A | 7/1987 | Amundson et al. |
| 4,714,992 A | 12/1987 | Gladney et al. |
| 4,922,491 A | 5/1990 | Coale |
| 5,652,613 A | 7/1997 | Lazarus et al. |
| 5,664,100 A | 9/1997 | Miura |
| 5,678,002 A | 10/1997 | Fawcett et al. |
| 5,758,088 A | 5/1998 | Bezaire et al. |
| 5,887,216 A | 3/1999 | Motoyama |
| 5,918,214 A | 6/1999 | Perkowski |

(Continued)

OTHER PUBLICATIONS

Evidence Packet aol_ads 1-4.*

(Continued)

*Primary Examiner*—John G. Weiss
*Assistant Examiner*—Matthew L. Brooks
(74) *Attorney, Agent, or Firm*—Fish & Richardson P.C.

(57) ABSTRACT

Various disclosed help center features provide help to a user without a staffed help center, provide help to a user before the user recognizes the need, or create targeted commerce opportunities for a provider of goods or services. One help center feature provides a user with help that is specifically related to a component in the user's computer system and that is supplied to the help center feature by the component manufacturer. Another help center feature detects a condition that degrades performance, and hence user satisfaction, and alerts the user. Another help center feature detects an attempt by a computer system to inform the user of degraded performance and offers the user a solution. Another help center feature provides a user with a commerce opportunity specifically related to a component in the user's computer system and/or to the user's geographic location.

36 Claims, 14 Drawing Sheets

U.S. PATENT DOCUMENTS

| | | | |
|---|---|---|---|
| 5,926,636 | A | 7/1999 | Lam et al. |
| 5,933,811 | A | 8/1999 | Angles et al. |
| 5,996,011 | A | 11/1999 | Humes |
| 5,996,022 | A | 11/1999 | Krueger et al. |
| 6,003,078 | A * | 12/1999 | Kodimer et al. ............ 709/224 |
| 6,014,651 | A | 1/2000 | Crawford |
| 6,055,364 | A | 4/2000 | Speakman et al. |
| 6,074,434 | A | 6/2000 | Cole et al. |
| 6,088,732 | A | 7/2000 | Smith et al. |
| 6,101,531 | A | 8/2000 | Eggleston et al. |
| 6,128,668 | A | 10/2000 | Barber et al. |
| 6,141,010 | A | 10/2000 | Hoyle |
| 6,151,643 | A | 11/2000 | Cheng et al. |
| 6,199,204 | B1 | 3/2001 | Donohue |
| 6,289,332 | B2 | 9/2001 | Menig et al. |
| 6,314,565 | B1 | 11/2001 | Kenner et al. |
| 6,434,532 | B2 | 8/2002 | Goldband et al. |
| 6,457,076 | B1 * | 9/2002 | Cheng et al. ................. 710/36 |
| 6,473,788 | B1 * | 10/2002 | Kim et al. ................... 709/209 |
| 6,477,531 | B1 | 11/2002 | Sullivan et al. |
| 6,529,692 | B1 * | 3/2003 | Haines et al. ................. 399/27 |
| 6,604,044 | B1 | 8/2003 | Kirk |
| 6,628,134 | B1 * | 9/2003 | Lee ............................. 324/763 |
| 6,629,134 | B2 * | 9/2003 | Hayward et al. ............ 709/217 |
| 6,629,136 | B1 * | 9/2003 | Naidoo ........................ 709/219 |
| 6,754,895 | B1 | 6/2004 | Bartel et al. |
| 6,757,740 | B1 | 6/2004 | Parekh et al. |
| 6,769,031 | B1 | 7/2004 | Bero |
| 6,798,997 | B1 * | 9/2004 | Hayward et al. .............. 399/12 |
| 6,937,999 | B1 * | 8/2005 | Haines et al. ................. 705/26 |
| 6,976,251 | B2 | 12/2005 | Meyerson |
| 7,117,239 | B1 * | 10/2006 | Hansen ........................ 709/200 |
| 7,124,097 | B2 * | 10/2006 | Claremont et al. ............ 705/26 |
| 7,290,247 | B2 | 10/2007 | Moran et al. |
| 2001/0056367 | A1 | 12/2001 | Herbert et al. |
| 2002/0065736 | A1 * | 5/2002 | Willner et al. ................. 705/26 |
| 2002/0065950 | A1 * | 5/2002 | Katz et al. ................... 709/318 |
| 2002/0078160 | A1 * | 6/2002 | Kemp et al. .................. 709/208 |
| 2002/0184619 | A1 | 12/2002 | Meyerson |
| 2003/0080988 | A1 | 5/2003 | Moran et al. |

OTHER PUBLICATIONS

Evidence Packet aol_upgrades 1-5.*
PUMATECH™, Synchronize Your World™. The material included was printed from http://www.pumatech.com.
McAfee.com, Secure Your PC, The material included was printed from http://www.mcafee.com.
SupportSoft, Resolution Suite v5.5, Raising the Standard for Support Automation. The material included was printed from http://www.support.com.
Governmentguide.com: The material included was printed from http://www.governmentguide.com.
Alterna TIFF pop-up window.
GT Mail: The material included was printed from http://www.kiddonet.com/kiddonet/supportMenu/.
Proposed AOL Help Center, pp. 67-75 from provisional: The material included was printed from http://64.59.36.82/aolhelp/indexl.htm, http://64.59.36.82/aolhelp/index2.htm, and/or http://64.59.36.82/aolhelp/index3.htm.
Michael, Bill, "Hey, Buddy . . . (*Internet*/*Web*/Online Service Information)," *Computer Telephony*, vol. 8, No. 11, p. 48, Nov. 2000 (reprinted as pp. 13-25).
"Client-Server Applications!: The Many Faces of SQL!," *Network Computing*, Mar. 1992, p. 56 (reprinted as pp. 25-31).
Blum, Daniel, and Rowe, Gary, "More Messaging Options Deliver Selection Headaches," *Network World*, Mar. 13, 1995, p. 53 (reprinted as pp. 71-77).
"Centerpost: The Messenger Without Conditions," *CableFAX*, Aug. 16, 2000, vol. 11, Issue 160 (reprinted as pp. 77-79).

* cited by examiner

HELP CENTER AND PRINT CENTER APPLICATIONS

CROSS-REFERENCE TO RELATED APPLICATIONS

This application claims priority from U.S. Provisional Application No. 60/330,590, filed Oct. 25, 2001, and titled HELP CENTER APPLICATION, which is incorporated by reference. This application is being filed concurrently with two related applications titled HELP CENTER AND FILTERING APPLICATIONS and HELP CENTER AND CONDITION-BASED APPLICATIONS.

TECHNICAL FIELD

This invention relates generally to computer networking, and various aspects relate more particularly to providing help center functions electronically.

BACKGROUND

Providers of goods and services generally desire to satisfy their users with the performance of the goods or services. This desire may arise for a variety of reasons, one of which is the likelihood of future sales. To help ensure user satisfaction, the provider of a good or service generally includes an instruction manual, which may be paper or electronic, that provides guidance on using the good or service and that helps a user to solve certain problems that may arise during use of the product or service. Providers of goods and services also often make available one or more staffed help centers with which users can communicate by phone or electronic mail.

SUMMARY

There is a continuing need, however, for additional forms of assistance that provide good results for the user and that are cost effective, compared, for example, to staffed help centers. Various help center features described below, for example, provide help or services to a user in addition or as a surrogate to a staffed help center, before or after the user recognizes the need for help or services, or create and enable targeted commerce opportunities for a provider of goods or services. One help center feature provides a user with help that is specifically related to a component in the user's computer system and that is supplied to the help center by the component manufacturer. Another help center feature detects a condition that degrades performance, and hence user satisfaction, and alerts the user. Yet another help center feature detects an attempt by a computer system to inform the user of degraded performance and offers the user a solution. Still another help center feature provides a user with a commerce opportunity specifically related to a component in the user's computer system and/or to the user's geographic location.

In one general aspect, providing automated electronic customer service for a computer includes electronically accessing a component identification item identifying a component of a target computer system, electronically selecting based on the component identification item at least one but less than all of multiple service providers for which electronic component support items are available, electronically accessing a component support item relating to support of the identified component, and electronically determining a support recommendation based on the component support item accessed and the at least one service provider selected.

Accessing the component support item may be based on the at least one selected service provider. Accessing the component identification item and selecting the service provider may be performed by a first computer system, and accessing the component support item and determining the support recommendation may be performed by a second computer system. The first computer system may include the target computer system and the second computer system may include a computer system of the service provider, and the component identification item may be provided to the service provider computer system. The target computer system may provide the component identification item to the service provider computer system after selecting the service provider. The target computer system may provide the component identification item to a computer system of a second service provider. The target computer system may receive a first support recommendation from the service provider computer system and a second support recommendation from the second service provider computer system, and the target computer system may select the service provider after receiving the first and second support recommendations.

Accessing the component identification item may be performed by a first computer system, and accessing the component support item, selecting the at least one service provider, and determining the support recommendation may be performed by a second computer system. The component may be a printer, and accessing the component identification item may include deriving, at least in part, the component identification item from a filename for a device driver associated with the printer.

A single computer system may access the component identification item, select the service provider, access the component support item, and determine the support recommendation. The single computer system may be the target computer system. The target computer system may select among several potential component support items made accessible by a support computer system, the potential component support items representing support for various components by various service providers. The single computer system may be a second computer system that is physically remote from the target computer system, and the support recommendation may be forwarded electronically from the second computer system to the target computer system.

The component support item may include a header and a body, the header identifying the component being supported by the component support item, and the body including an item selected from a group consisting of a warning regarding the component, a notice of an available upgrade, and a software patch. Accessing the component identification item may include performing a scan of the target computer system. Pre-authorization may be received from an owner of the target computer system for performing the scan automatically.

Accessing the component identification item may include accessing a profile of the target computer system. The support recommendation may be displayed electronically. The support recommendation may be executed electronically. Executing the support recommendation may include downloading and installing a piece of software. Executing the support recommendation may include modifying a configuration parameter of the target computer system.

The service provider that is selected may be displayed electronically. Determining the support recommendation may include determining a non-commerce support recommendation. The non-commerce support recommendation may include a recommendation selected from a group consisting of a notice of a recall, help operating or installing an application or device, an application note, a notice of a software patch, and news. The non-commerce support recommendation may be communicated to a user using an application that is not primarily a component support application.

In another general aspect, a system for providing automated electronic customer service for a computer includes a storage device, and one or more processors collectively programmed to access electronically a component identification item identifying a component of a target computer system, to select electronically based on the component identification item at least one but less than all of multiple service providers for which electronic component support items are available, to access electronically a component support item relating to support of the identified component, and to determine electronically a support recommendation based on the component support item accessed and the at least one service provider selected.

At least one processor may be programmed to perform each, but not necessarily more than one of the operations of accessing the component identification item, selecting at least one but less than all of multiple service providers, accessing the component support item, and determining the support recommendation. One processor may be programmed to perform at least the operations of accessing the component identification item, selecting at least one but less than all of multiple service providers, accessing the component support item, and determining the support recommendation.

In another general aspect, providing automated electronic customer service for a computer includes electronically accessing a component identification item identifying a component of a target computer system, electronically accessing a component support item relating to support of the identified component, electronically accessing a geographic indicator related to the computer for which automated electronic customer service is provided, and electronically determining a geographically-based support recommendation based on the component identification item, the component support item, and the geographic indicator.

Accessing the component support item may be based on the component identification item. A service provider may be selected based on the component identification item. Accessing the geographic indicator may include accessing a zip code in a profile for a user of the target computer system. Accessing a geographic indicator may include accessing local point-of-presence information. The geographically-based support recommendation may include an advertisement from a service provider in a zip code related to a zip code of the user.

In another general aspect, providing automated electronic customer support for a computer includes electronically accessing a component identification item identifying a component of a target computer system, electronically selecting one of multiple service providers based on identification of the component identified by the electronically accessed component identification item, and providing the user electronic access to a component support item relating to support of the identified component and to the selected service provider.

Accessing the component identification item may include scanning the target computer system. Accessing the component identification item may include querying a user of the target computer system for information. Selecting a service provider may include performing a table look-up based on the information in the component identification item. Providing access may include providing an Internet link to an on-line store associated with the selected service provider, the store having the component support item.

Providing access may include electronically supplying the selected service provider with the component identification item, and receiving the component support item electronically from the selected service provider. The component support item may include an advertisement relating to the identified component.

Accessing the component identification item may include issuing an application-program interface ("API") call to an operating system running on the target computer system to determine the device driver file name for an active printer on the target computer system. Providing access may include determining if the device driver is a current version, and providing, if the device driver is not the current version, the user electronic access to the current version. Determining if the device driver is the current version may include electronically storing a current version number for the device driver, issuing a second API call to determine a version number of the device driver, and comparing the device driver's version number to the current version number.

A geographic indicator may be electronically accessed that indicates a location of the target computer system, and the component support item may be tailored to the geographic indicator. The target computer system may be connected to a network, and the geographic indicator may include a city identifier determined from the target computer system's connection to the network. The geographic indicator may include a zip code of the user of the target system. The user may be queried to determine if the user is presently in the zip code.

In another general aspect, an apparatus for providing automated electronic customer support for a computer includes a storage device and a processor programmed to access electronically a component identification item identifying a component of a target computer system, to select electronically one of multiple service providers based on identification of the component identified by the component identification item, and to provide the user electronic access to a component support item relating to support of the identified component and to the selected service provider.

In another general aspect, providing automated electronic customer support for a computer includes electronically accessing a component identification item identifying a component of a target computer system, electronically accessing a geographic indicator indicating the location of the target computer system, and providing the user electronic access to a component support item relating to support of the identified component and to the geographic indicator.

A service provider may be electronically selected based on the component identification item, and the component support item to which the user is provided access also may relate to the selected service provider.

The details of one or more implementations are set forth in the accompanying drawings and the description below. Other features will be apparent from the description and the drawings, and from the claims.

DETAILED DESCRIPTION

Figure 1:
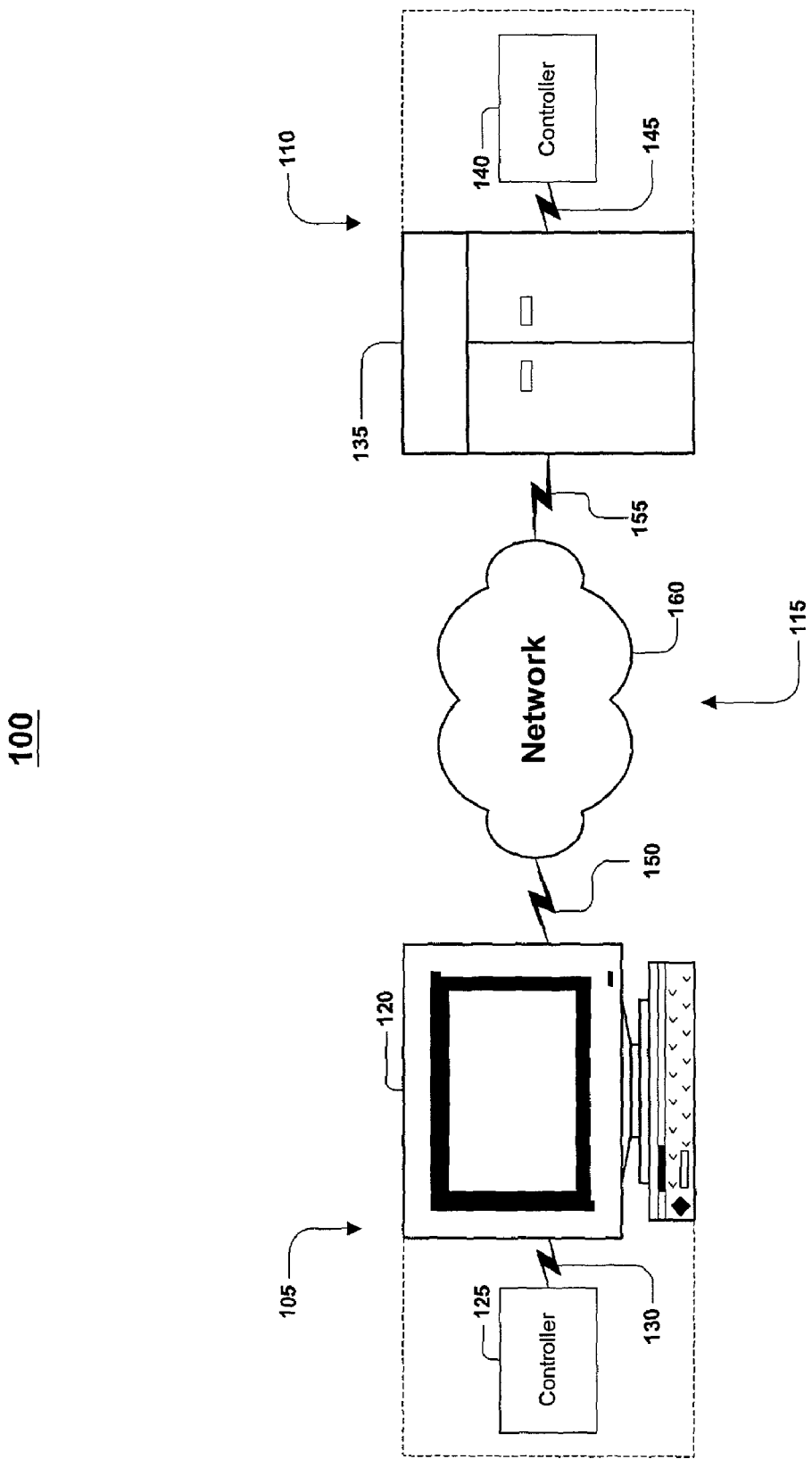
FIGS. 1 and 2 are examples of systems configured to implement a disclosed help center feature.

The following introductory implementation provides at least one context for the subsequent discussion. One implementation provides help center features, support features, and customer service features for a user dialing in to a host computer system that provides information services, such as the services provided by America Online, Inc. ("AOL"). Note that the words help, support, and service, as well as terms involving these words, are used interchangeably through this disclosure. The user computer system and the host computer system each include software components communicating with each other over a communication link. After securing the user's authorization, the software component on the user computer system acquires information about the components on the user system, and sends this information to the host computer system. The host computer system uses the component information in searching a database of partnering service providers to identify and select which potential service provider may be able to offer support or help to the user. A service provider is a provider of help, support, or service, and examples of service providers include manufacturers, repair centers, sales centers, technical support call centers and other help centers, and integration specialists. After selecting a service provider, the host computer system accesses a database containing support information from the service provider that relates to one or more of the components on the user computer system. The host computer system then determines which piece of support information to communicate to the user.

As a result, the host computer system can provide the user with timely information relevant to the user computer system. Such information can include, for example, a notice of a software patch, a notice of an available discount on an upgrade, a notice that a more recent version of particular software is available, or answers to frequently asked questions about installation or use of a particular component.

The implementation allows either the user or the host computer system to initiate communication. The user can query the host computer system to get customer service for a particular component, such as a new modem that the user is having trouble installing or operating. The help or support can be provided electronically and automatically, that is, without human intervention other than the user, thus freeing up the limited resource of operators staffing a help center for a service provider, and allowing the host computer system to provide much of the help center service for more than one different service provider. Conversely, the implementation also allows the host computer system to initiate communication and provide the user with unsolicited support information relating to components on the user computer system. This can prevent occurrence of problems at the user computer system. It can also provide a commerce opportunity for the service provider. The user may be provided an opportunity to opt out of such unsolicited support information messages.

Accordingly, the implementation provides a background support feature at a user computer system that attempts to solve problems as, or before, the problems are experienced or otherwise perceived. The implementation searches the registry of the user computer system for various sub-optimal conditions, such as inefficient modem settings, and either changes the conditions or alerts the user that the conditions are sub-optimal. Attempts by applications or the operating system to inform the user of particular errors are also captured. Such errors can include, for example, a failure to get a dial tone on a modem. The errors are either fixed or a solution is suggested to the user. In this way, the user computer system and particular applications run more efficiently and the user's satisfaction is increased.

The above implementation offers the additional advantage that the customer service is provided through an information services network. Such a network provides a base of customers, all typically having a periodic need for service for a variety of components. The network, and the application that interacts with the network, also offers users additional services beyond the support provided by an application that is primarily a component support application, such as, for example, a utilities application.

Referring to FIG. 1, a system 100 that implements at least one disclosed help center feature includes a user computer system 105 coupled to a host computer system 110 over a communications link 115. The user computer system 105 includes a user device 120 connected to a user controller 125 by a wired or a wireless data pathway 130 capable of delivering data. The host computer system 110 includes a host device 135 connected to a host controller 140 by a wired or a wireless data pathway 145 capable of delivering data.

The user device 120 (or the host device 135) is generally capable of executing instructions under the command of the user controller 125 (or the host controller 140). One example of a user device 120 is a device driver.

The communications link 115 includes a delivery network 160 making a direct or an indirect communication link between the user computer system 105 and the host computer system 110, irrespective of physical separation. The communications link 115 includes communication pathways 150, 155 that enable communications through the delivery network 160.

Figure 2:
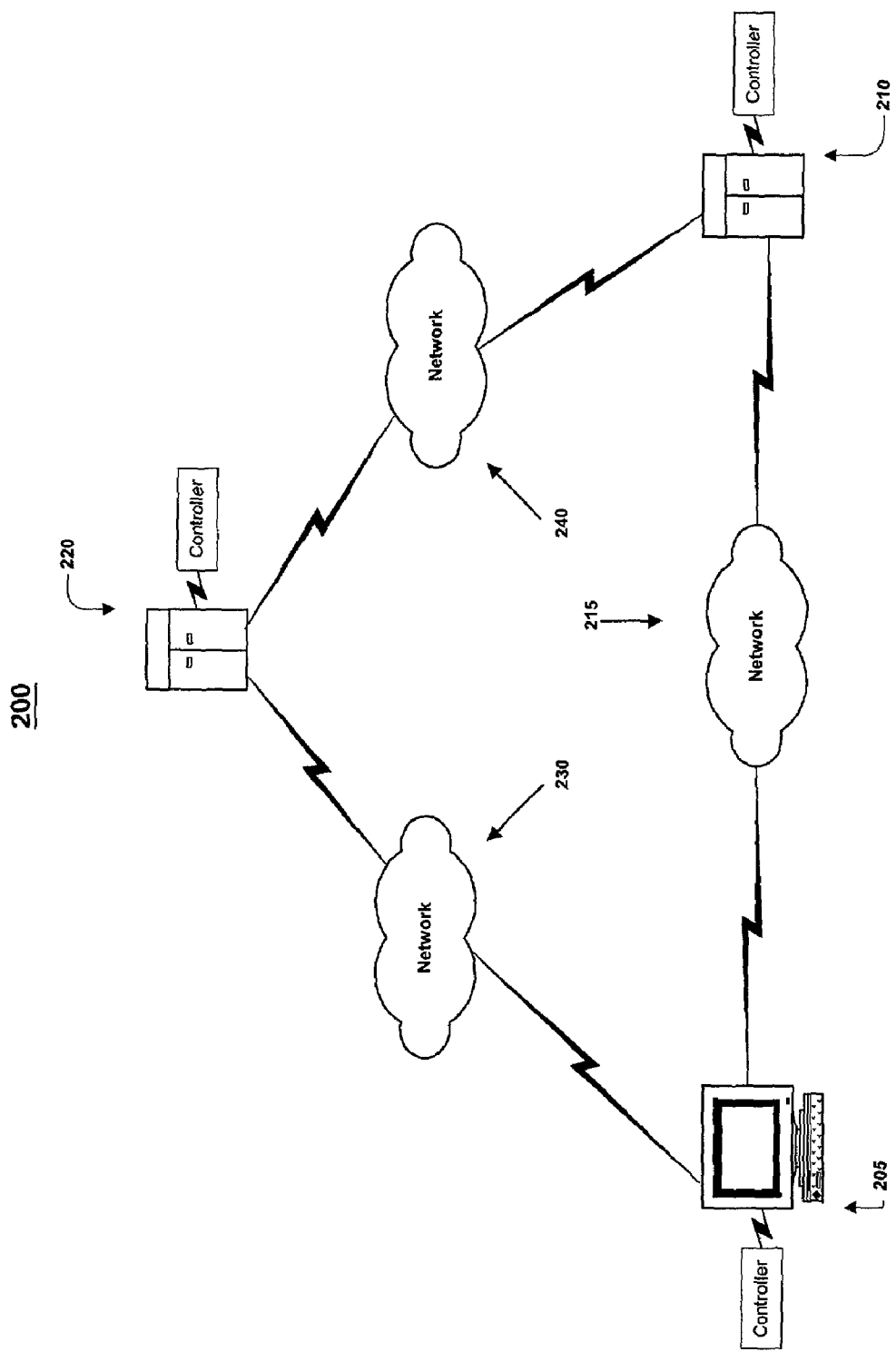

Referring to FIG. 2, another system 200 that implements at least one disclosed help center feature includes a user computer system 205 coupled to a host computer system 210 over a communications link 215. The system 200 also includes a service provider computer system 220 coupled to the user computer system 205 over a communications link 230 and coupled to the host computer system 210 over a communications link 240.

The user computer system 205 is analogous to the user computer system 105. The host computer system 210 and the service provider computer system 220 are each analogous to the host computer system 110. The communications links 215, 230, 240 are each analogous to the communications link 115.

Figure 3:
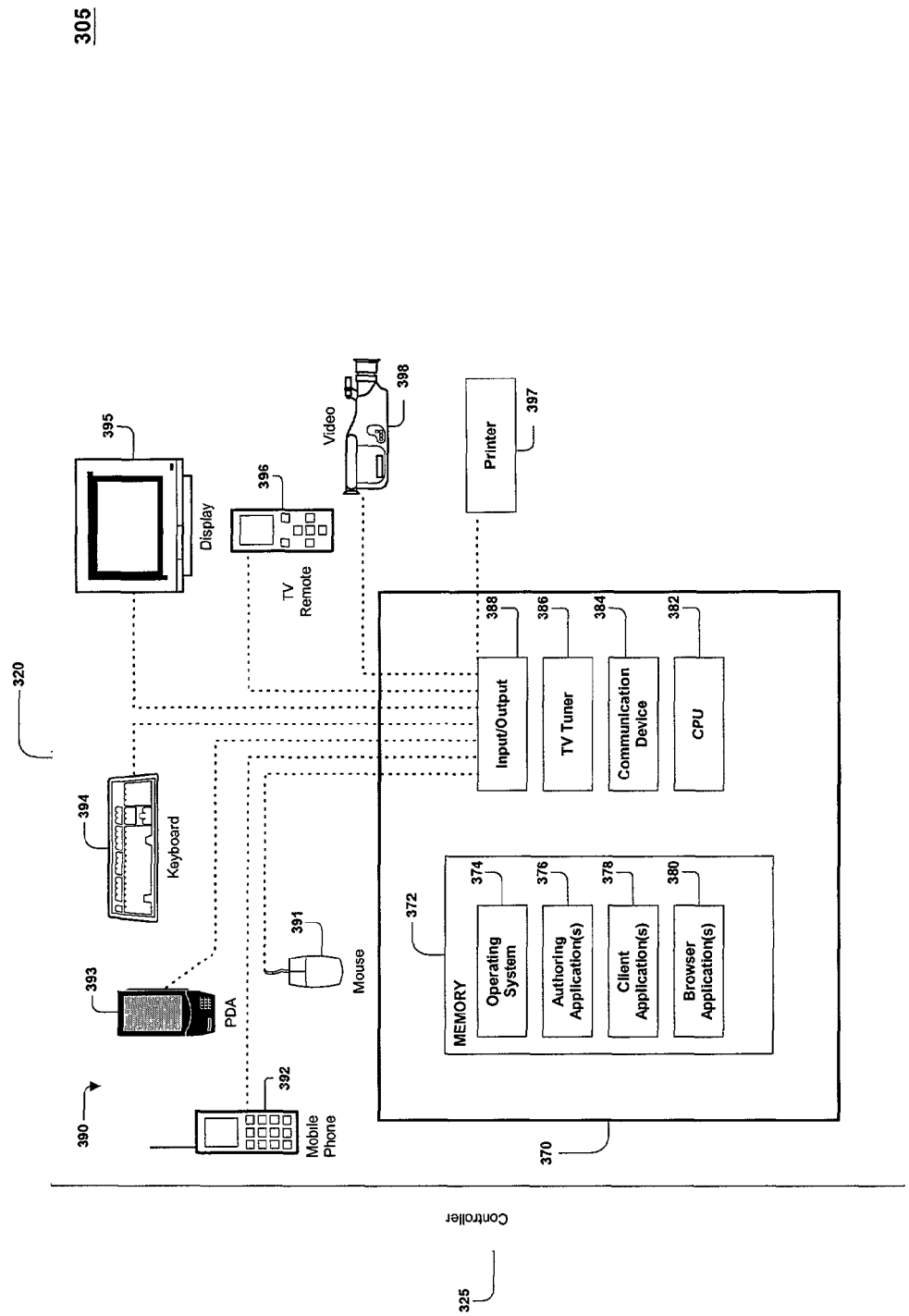
FIG. 3 is an example of a user system for use in the systems from FIGS. 1 and 2.

Referring to FIG. 3, a user computer system 305 is an example of the user computer system 105 of FIG. 1. The user computer system 305 includes a user device 320 that is analogous to the user device 120 and a user controller 325 that is analogous to the user controller 125. The user controller 325 controls the user device 320.

The user device 320 includes a general purpose computer 370 having an internal or external storage 372 for storing data and programs such as an operating system 374 (for example, DOS, Windows®, Windows® 95, Windows® 98, Windows® 2000, Windows® NT, Windows® Millennium Edition, Windows® XP, OS/2, or Linux) and one or more application programs. Examples of application programs include authoring applications 376 (for example, word processing programs, database programs, spreadsheet programs, presentation programs, or graphics programs) capable of generating documents or other electronic content; client applications 378 (for example, AOL user, CompuServe user, AIM user, AOL TV user, or ISP user) capable of communicating with other computer users, accessing various computer resources, and viewing, creating, or otherwise manipulating electronic content; and browser applications 380 (for example, Netscape's Navigator or Microsoft's Internet Explorer) capable of rendering standard Internet content.

The general-purpose computer 370 also includes a central processing unit 382 ("CPU") for executing instructions in response to commands from the user controller 325. In one implementation, the user controller 325 includes one or more of the application programs installed on the internal or external storage 372 of the general-purpose computer 370. In another implementation, the user controller 325 includes application programs externally stored in and executed by one or more device(s) external to the general-purpose computer 370.

The general-purpose computer 370 includes a communication device 384 for sending and receiving data over, for example, communications link 115, and a television ("TV") tuner 386 for receiving television programming. As a result, the user device 320 can selectively and/or simultaneously display network content received by the communication device 384 and television programming content received by the TV tuner 386. The general-purpose computer 370 also includes an input/output interface 388 to enable a wired or a wireless connection to various peripheral devices 390. Examples of peripheral devices 390 include a mouse 391, a mobile phone 392, a personal digital assistant 393 ("PDA"), a keyboard 394, a display monitor 395 with or without a touch screen input, a TV remote control 396, a printer 397, and a video camera 398.

Figure 4:
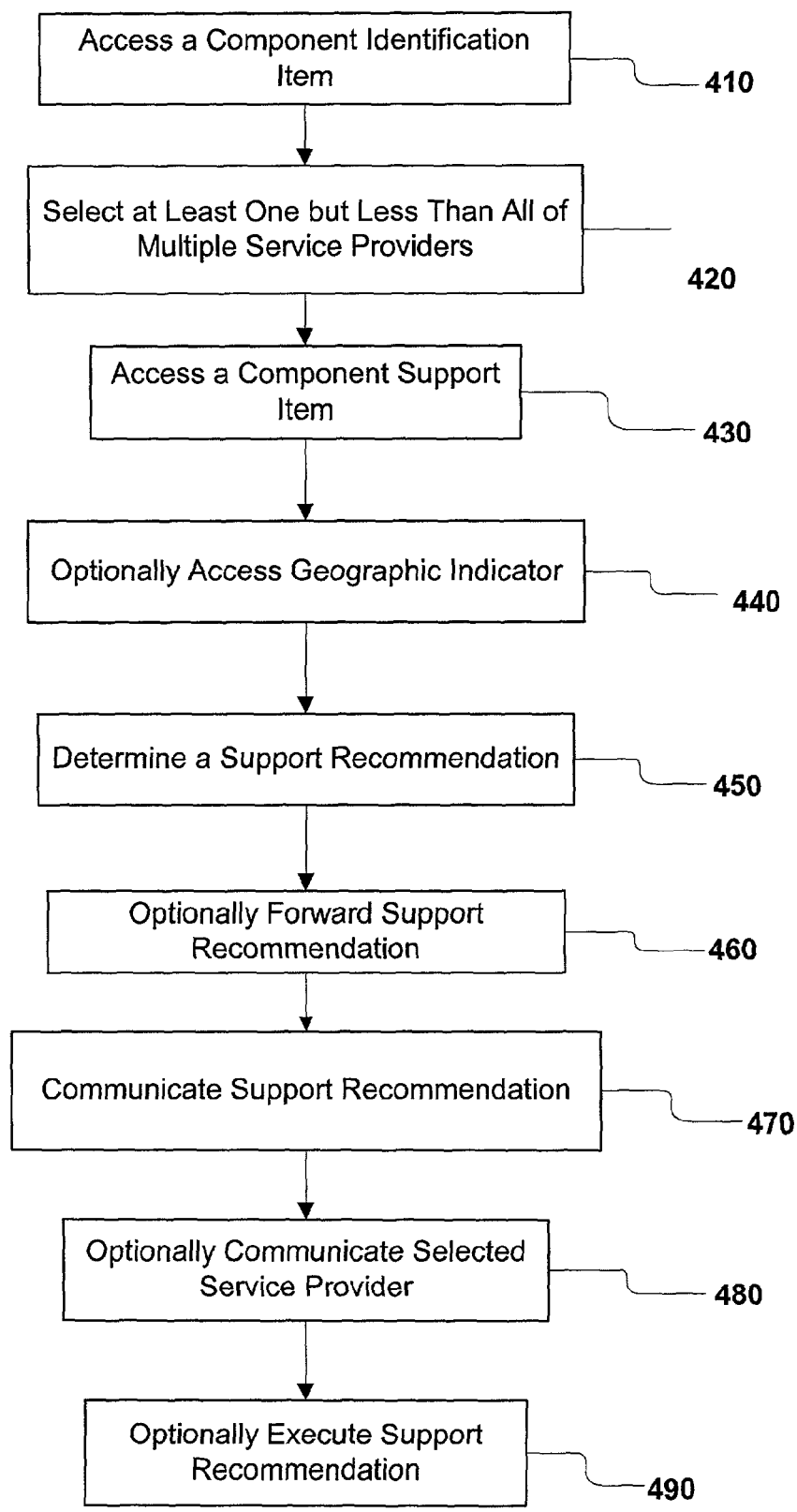
FIGS. 4-6 are flow charts of examples of processes that determine a support recommendation based on an identified component.
Figure 5:
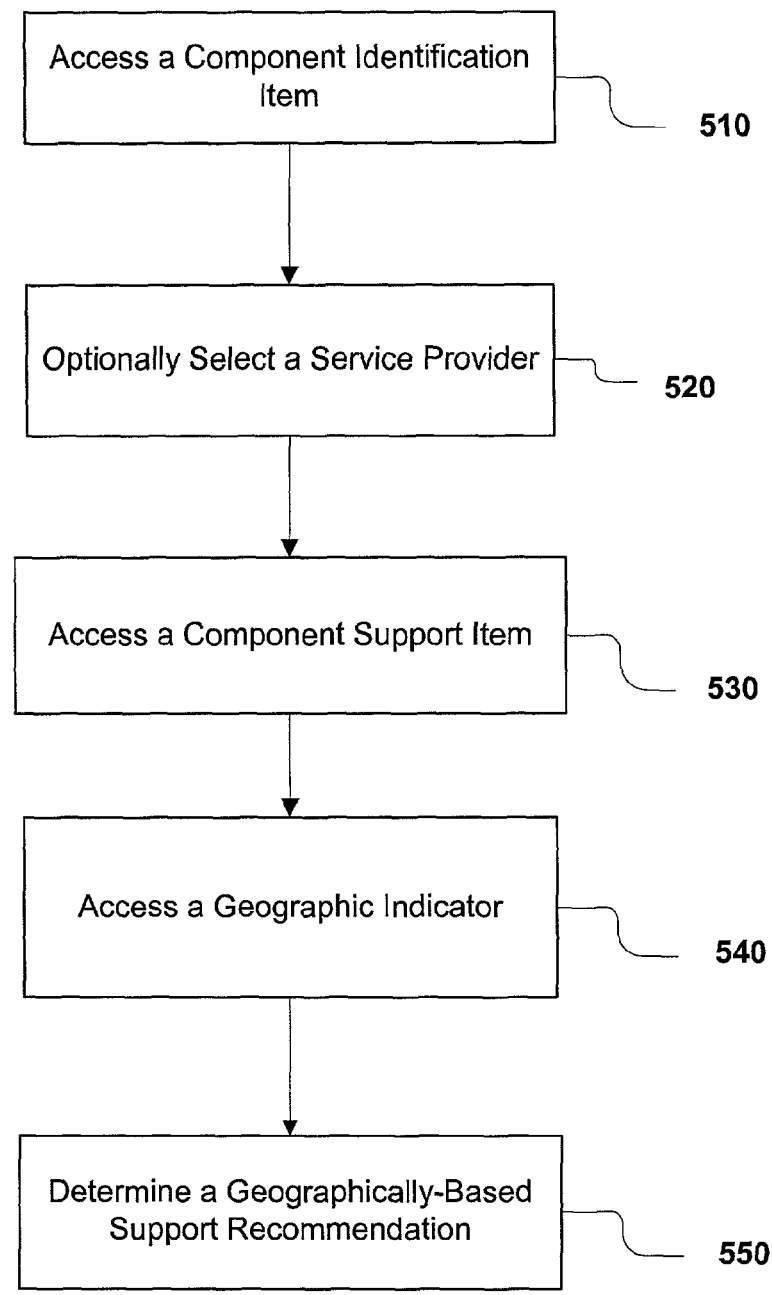
Figure 6:
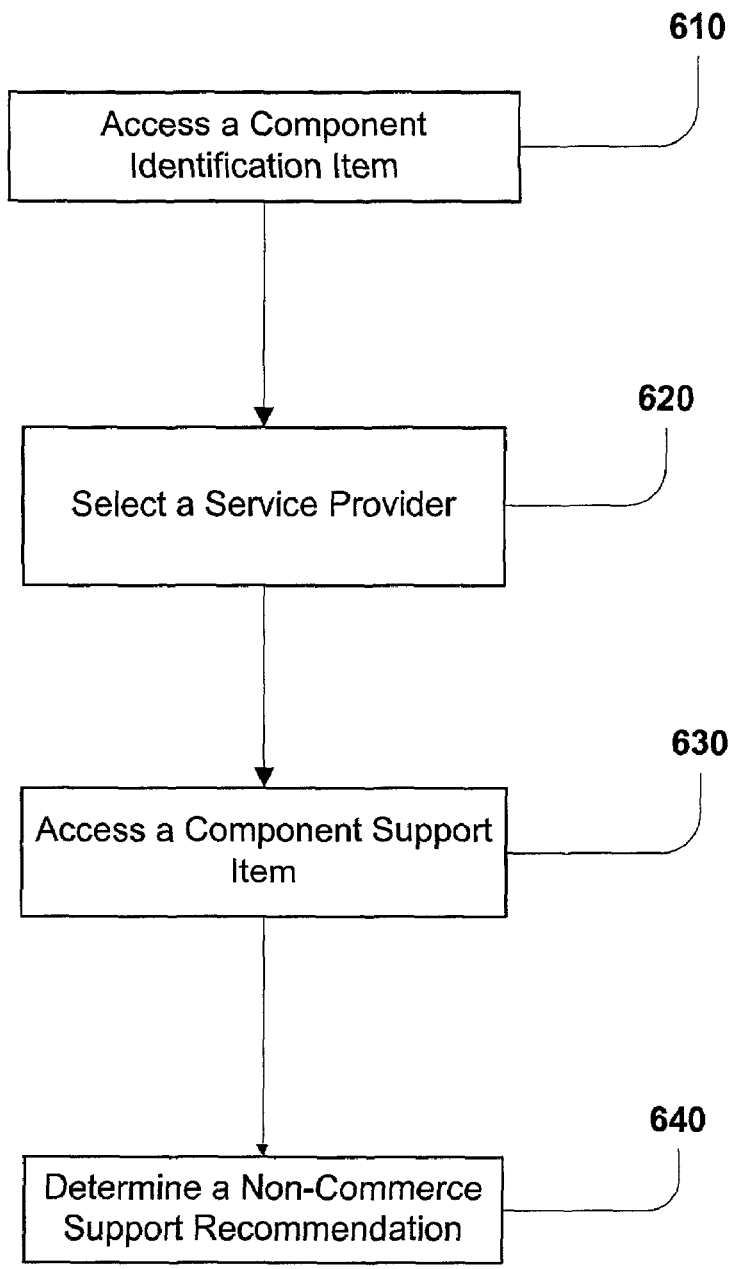

FIGS. 4-6 show processes 400, 500, and 600 for providing customer service. The processes 400, 500, and 600 can be implemented by, for example, one of the systems 100, 200, and 305 in FIGS. 1-3. The processes 400, 500, and 600 are explained below, and implementations of each process are described.

Referring to FIG. 4, the process 400 includes accessing a component identification item (410). The component identification item can be accessed for a variety of reasons. For example, a user, an application, or an operating system may request help, support, or some other type of service; an application or another system may determine that some service is needed based on, for example, user actions; or an application or another system may initiate the process 400 based on, for example, a timer, without any indication that some service is needed.

A component identification item identifies a component of a target computer system. The identification can be general or specific. For example, if the component is a printer, the component identification item can merely indicate that the component is a peripheral or a printer, or the component identification item can indicate more specific information such as, for example, a manufacturer, a model number, or a configuration setting. A component identification item can be implemented, for example, as a data element having fields for information about the component, such as component type, manufacturer, and model number or version.

Accessing a particular item, such as, for example, a component identification item (410), refers to any process of obtaining, reading, or receiving the item. For example, an item can be accessed by reading the item from a memory, receiving the item from a keyboard buffer or other input device, receiving a transmitted item, or requesting the item. Accessing a component identification item (410) can include, for example, scanning a target computer system to determine component information, accessing a profile of a computer system, or querying a user or device to supply component information. To facilitate providing customer service, a user may pre-authorize access to information on, at, or through the user computer system by scanning or otherwise.

At least one, but less than all, of several available service providers is selected based on the accessed component identification item (420). Such selection may be made from among multiple available service providers, which may include manufacturers, distributors, repair centers, sales centers, and help centers related to the accessed component identification item. The available service providers may be indicated in a variety of ways, such as, for example, by maintaining a list or other record. Thus, if the component identification item indicates that the component is a printer manufactured by Hewlett-Packard, and Hewlett-Packard is one of the available service providers, then Hewlett-Packard may be selected.

At least one component support item is accessed (430). A component support item relates to support of a component identified by the component identification item, where the support is intended to be beneficial or relevant to a user of the component, whether or not the user perceives the support or its effects. For example, a component support item supporting a Hewlett-Packard printer can include an advertisement, a recall notice, and a notice of a software patch available for a particular device driver or the patch itself. A component support item can be implemented, for example, as a data element having a header identifying the component being supported and having a body containing the support information (for example, the advertisement or notice). The data element may also have a field indicating one or more service providers associated with the component support item. For example, if the body of the data element includes an advertisement for a Hewlett-Packard printer, then service providers such as Hewlett-Packard and any independent retail centers honoring the advertised offer may be associated with the component support item.

Accessing the one or more component support items (430) can be based on a service provider that has been selected (420). For example, before accessing a component support item, it can be verified that the component support item relates to a service provider that has been selected. Further, the component support item can be selected from among several potential component support items representing support for different components by different service providers. For example, a system may maintain a database of component support items with an entry for each component support item. The database may contain a field for the component(s) being supported by a component support item, a field for the service provider(s) associated with the component support item, and one or more fields describing the support. The entries may be retrievable and searchable using these or other fields. One such database may include a database entry with the component field containing "printer," a service provider field containing "Hewlett Packard," and a support field containing an advertisement for toner cartridges.

A geographic indicator also may be accessed (440). The geographic indicator provides geographic information on, for example, the target computer system, the identified component of the target computer system, or a user of the target computer system. In an implementation involving a user connecting to a host computer system by dialing in or otherwise, the geographic indicator can include, for example, geographic information relating to user interest or usage, such as, for example, geographic information indicating the area from which the user connected to the host system, geographic information detected from usage, or geographic information from a user profile. A host computer system that allows users to connect through one of many front end machines, with each machine being referred to as a point of presence ("POP"), may track that information. For example, a user in Washington, D.C. may connect to a national network using a local call to a POP in, for example, Washington, D.C. or Arlington, Va., and the host computer system may retain this information. Furthermore, geographic information may be gleaned from user activities during registration of software or devices, during entry of data with respect to e-commerce activities or other local or remote electronic interfaces presented to the user, or during other user manipulation of a computer (for example, search activities). The user also can be directly queried either to provide or verify geographic information, and the user's response can then be accessed. A user profile can contain geographic information such as, for example, area code, zip code, city, or state.

A support recommendation is determined based on one or more of the component identification item, the component support item(s), and the at least one selected service provider (450). Determining a support recommendation can include determining whether a component support item (or which of several component support items) relates to the identified component and to one of the supported service providers. For example, if the identified component is a Hewlett-Packard printer of a particular model, a supported (that is, potentially selected) service provider is Hewlett-Packard, and a component support item is an e-commerce advertisement that offers a discounted upgrade for current owners of the particular model of Hewlett-Packard printer, then determining a support recommendation can include determining to advise the user of the advertised offer.

Continuing with this example, selected service providers may also include a repair center, and accessed component support items may also include an advertisement for toner cartridges. In this continuing example, determining a support recommendation can include determining to advise the user of one or both advertisements (the upgrade and the toner). The user might be advised of the toner offer if, for example, information is available indicating that the printer is low on toner. The user might be advised of the upgrade offer if, for example, information is available indicating a user's preference for a printer upgrade. As these examples indicate, determining a support recommendation can be based on additional information, can relate to multiple service providers and/or multiple component support items, and can involve selection of one or more of multiple available options. Further, some implementations do not select a service provider and, therefore, the determination of a support recommendation is not based on a selected service provider.

Determination of the support recommendation (450) also may be based on a geographic indicator if one was optionally accessed (440). For example, the support recommendation can include determining to advise the user of a sale at a sales center in a geographic location convenient to the user. Determining whether two locations are convenient to one another may be done, for example, by comparing zip codes, area codes, or cities.

Optionally accessing a geographic indicator (440) may be performed at another point in the process 400. For example, a geographic indicator optionally can be accessed (440) before selecting a service provider (420). In such a case, the geographic indicator may be used in the selection of at least one service provider (420), such as, for example, by selecting a sales center that is near a user. Additionally or alternatively, a geographic indicator optionally can be accessed (440) before a component support item is accessed (430). In such a case, the geographic indicator may be used to access one or more component support items. For example, if there are no local service providers, then component support items offering an e-commerce opportunity may be accessed (430) rather than component support items offering walk-in service. As these and other examples illustrate, the order in which the operations are performed in this process 400 and the other processes discussed in this disclosure may vary and depends on the implementation.

A support recommendation can be forwarded to a target or other computer system or user (460), and communicated at that target or other computer system or otherwise communicated to a user (470). If a support recommendation is determined at a host computer system, the support recommendation can be forwarded to a target computer system and communicated, for example, using a display, a printer, an electronic mail message, an instant message, or a sound. Any method of communication that uses a computer can be referred to as electronic communication.

Multiple support recommendations may be determined (450). For example, an implementation may determine a support recommendation (450) for each of multiple selected service providers. The support recommendations can be filtered or selected such that only one is communicated to a user, or multiple support recommendations can be communicated (470). Such filtering or selecting of support recommendations may include selecting a service provider (420). This selection of a service provider (420) may have already been performed or may be being performed for the first time. For example, a target computer system may select an initial group of service providers to solicit support recommendations from and then may narrow the received support recommendations by further selecting the service providers.

An indication of a selected service provider can be communicated to a user or a target computer system (480). Such an indication includes, for example, a company logo that may be displayed to a user along with displaying to the user a support recommendation from that company. In other implementations, multiple company logos may be displayed to a user, indicating that support recommendations are available from those companies, and the user may select a company and receive that company's support recommendation.

A support recommendation can be executed (490). Execution of a support recommendation can include, for example, downloading and installing a software patch, displaying an advertisement, defragmenting a hard disk, deleting files in a temporary directory, or modifying a configuration parameter for a component.

Referring again to FIGS. 1-3, a variety of implementations may be provided for performing the process 400. These implementations involve one or more computer systems.

The process 400 can be implemented by the user computer system 305. In one implementation, the client application 378 accesses a component identification item (410) stored in the memory 372, which indicates that there is an attached printer 397 of a particular manufacturer and model number. The client application 378 then selects a service provider (420) by accessing information in the memory 372 that indicates that one of the available service providers is a service center that supports the manufacturer, model, and/or type of the attached printer 397, and selecting that service center as a service provider. The client application 378 accesses a component support item (430) stored in memory 372 that indicates that the printer 397 has been recalled due to a design error and that the printer 397 can be taken to the service center for free replacement. Based on the accessed component identification item, the selected service provider, and the accessed component support item, the client application 378 determines a support recommendation (450) that includes notifying the user of the computer system 305 that the attached printer 397 has been recalled and that the printer 397 can be replaced for free at the service center. The client application 378 displays the information (470, 480) on the display 395. In this implementation, the component support items and the list of available service providers from which to select can be provided to the user computer system 305 from, for example, a portable storage medium, an installed program, or a linked computer system such as, for example, a host computer system 110 (FIG. 1) or a service provider computer system 220 (FIG. 2).

As another example, software running on the user computer system 305 accesses a component identification item (410) indicating that the user computer system 305 includes a hard disk of a particular manufacturer and that the hard disk was last defragmented forty-five days ago. The software running on the user computer system 305 selects at least one manufacturer capable of supporting the hard disk (420), accesses a component support item (430) indicating that the hard disk operates optimally if it is defragmented every thirty days, and determines a support recommendation (450) that includes notifying (470) the user that the hard disk should be defragmented. Upon securing the user's authorization, the software defragments (490) the hard disk.

Yet another example involves software running on the user computer system 305 that provides new device drivers or updates existing device drivers. The software may access a component identification item (410) indicating that the user computer system 305 includes a particular device driver, or no device driver, for a selected device. The device may be selected by a user, for example, and may include, for example, a compact diskette ("CD") burner, a digital versatile disc or digital video disc (both of which are referred to as a "DVD") drive, and a printer. The software may access a device driver name by, for example, issuing an application program interface ("API") call to an operating system, performing a table look-up, scanning a floppy disc, or querying the user. The software may select at least one manufacturer capable of supporting the selected device (420), access a component support item (430) indicating that the existing device driver is not the most current version, and determine a support recommendation (450) that includes notifying (470) the user that the device driver should be updated. Upon securing the user's authorization, the software may update (490) the device driver. The support provided by the selected service provider may include, therefore, providing the information indicating that the existing device driver is not current and/or providing a current version of the device driver.

Other implementations of the process 400 can be performed entirely by a host computer system 110. In one such implementation, a component (for example, software or firmware) running on a host computer system 110 accesses a component identification item (410) received from the user computer system 305 after querying a user for information. The component identification item indicates that the user computer system 305 includes a word processing application of a particular manufacturer and version number. The component running on the host computer system 110 selects at least one service provider (420), from a list of potential service providers stored at the host computer system 110, based on the component, type, or manufacturer. The component running on the host computer system 110 then accesses at least one component support item (430) received from one or more service provider computer systems 220, wherein at least one of the component support items indicates that there is a software patch available to fix a bug in the word processing application. The component running on the host computer system 110 then determines, as a support recommendation (450), to notify the user of the available patch (470).

In the above example, multiple service providers may be selected (420) and multiple component support items may be accessed (430). Further, determining a support recommendation (450) may include notifying a user of information in multiple component support items, where each of the component support items has different content and is associated with a different service provider.

Similarly, a service provider computer system 220 (FIG. 2) can perform the process 400. For example, a service provider computer system 220 that is associated with a word processing manufacturer (service provider) may access a component identification item (410) from a list (or partial list) received from a host computer system 110, which list identifies applications on the user computer system 305 that are manufactured by the service provider. Noting that there is at least one such application on the list, the service provider selects itself as a supported service provider (420), and accesses a component support item stored at the service provider computer system 220 (430). The service provider then determines a support recommendation (450), such as recommending an available software patch, and communicates the recommendation (470).

Several examples of two or more computer systems working together to perform the process 400 are now described. A user computer system 305 can work together with either or both of a host computer system 110 or a service provider computer system 220 to perform the process 400. For example, the user computer system 305 can access the component identification item (410) and select the service provider (420). Next, the host computer system 110 or service provider computer system 220 can access the component support item (430) and determine the support recommendation (450). In such an implementation, the user computer system 305 may need to provide the component identification item to the other computer system 110 or 220, and the other computer system 110 or 220 may need to forward the support recommendation (460) to the user computer system 305 for display (470) or execution (490). A variation on that example is for the host computer system 110, or the service provider computer system 220, to select the service provider (420).

As the above implementations reveal, multiple parties can perform a given operation in the process 400. For example, a user computer system 305 can access a component identification item (410) and send it to a host computer system 110 which then accesses the received component identification item (410).

Referring to FIG. 5, the process 500 includes accessing a component identification item (510). A service provider is optionally selected (520). A component support item is accessed (530). A geographic indicator is accessed (540). A geographically-based support recommendation is determined (550). The process 500 differs, generally, from the process 400 in that the selection of a service provider is optional (compare 420 to 520) and the support recommendation is geographically-based (compare 450 to 550).

Referring again to FIGS. 1-3, one implementation of the process 500 includes a host computer system 110 accessing a component identification item (510) and a component support item (530). The host computer system 110 also accesses geographic information (540) based on local POP information or otherwise. The host computer system 110 then determines a support recommendation tailored to the geographic information (550). For example, if the user has indicated that a scanner attached to the user computer system does not work, the host computer system 110 can present the user with information on local repair shops. The information about local repair shops can be gathered, for example, from a stored database, or from a real-time search of an online directory. As this example indicates, selection of a service provider, selection of a component support item, and determination of a support recommendation can be based on data that is gathered in real time and that may not be stored in nonvolatile memory of storage devices on the system(s) performing the process 500. Similar techniques also may be applied to operations in other of the processes discussed in this disclosure.

The above implementation of the process 500 does not necessarily include a selection of a service provider (520), although the same support recommendation can be achieved if a service provider is selected. For example, one of the service providers listed in the directory search can be selected (520), with the selection occurring either before or after the search. If a service provider is selected (520), the selection also can be based, for example, on the component identification item.

Referring to FIG. 6, the process 600 includes accessing a component identification item (610), selecting a service provider (620), accessing a component support item (630), and determining a non-commerce support recommendation (640). A non-commerce support recommendation is a support recommendation that does not directly offer anything for sale or advertise anything as being for sale. For example, a non-commerce support recommendation can include help operating or installing an application or device, a recall notice, an application note describing how a component can be used, a notice of a software patch that can be downloaded from a network without charge, or news of relevant current events. The process 600 differs, generally, from the process 400 in that only one service provider need be available for selection (compare 420 to 620) and the support recommendation is a non-commerce support recommendation (compare 450 to 640).

Other implementations may determine support recommendations that are strictly commerce support recommendations, or hybrid non-commerce/commerce support recommendations. A hybrid support recommendation includes both non-commerce content and commerce content.

Referring again to FIGS. 1-3, one implementation of the process 600 includes a host computer system 110 providing news to a user computer system 305 that includes a mobile phone 392. The host computer system 110 accesses a component identification item (610) that indicates that the mobile phone 392 is not equipped for hands-free use, selects a news source as a service provider (620), and accesses a particular news item as a component support item (630). The news item may be, for example, news of current legislation affecting the legality of driving a car while using a mobile phone that is not equipped for hands-free use. The host computer system 110 determines a non-commerce support recommendation (640) that includes notifying the user computer system 305 of the news item.

Figure 7:
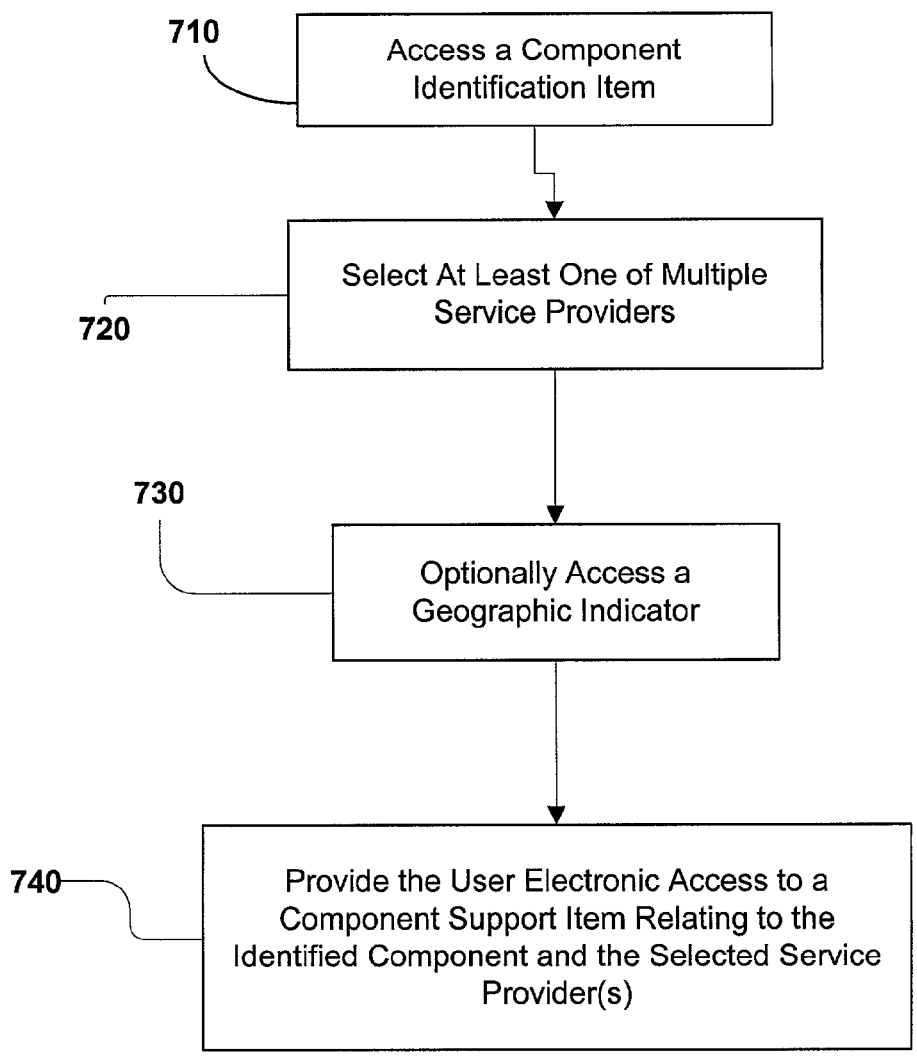
FIGS. 7-9 are flow charts of examples of processes that provide a user access to support based on an identified component.
Figure 8:
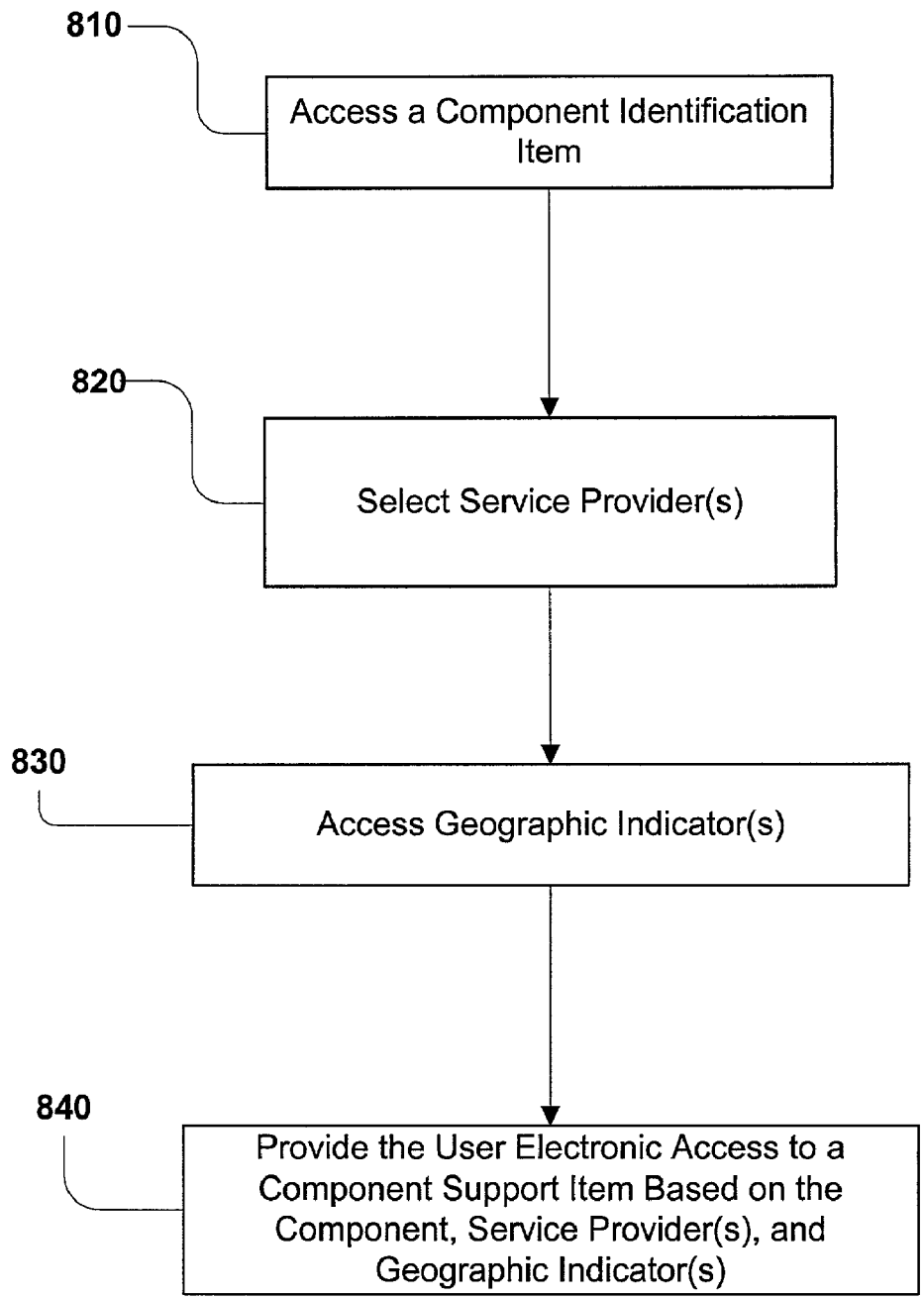

FIGS. 7 and 8 show two processes 700 and 800 for providing customer support by providing access to a component support item. The processes 700 and 800 can be implemented by, for example, one of the systems 100, 200 and 305 in FIGS. 1-3. The processes 700 and 800 are explained below, and implementations of each process are described.

Referring to FIG. 7, the process 700 includes accessing a component identification item (710), selecting at least one of multiple service providers (720), optionally accessing a geographic indicator (730), and providing a user with electronic access to a component support item relating to the component identified by the component identification item and to the selected service provider(s) (740). If a geographic indicator is accessed, then the component support item also may be filtered based on the geographic indicator. Other implementations do not select a service provider and, therefore, the component support item is not necessarily related to a service provider.

Referring to FIG. 8, the process 800 includes accessing a component identification item (810), selecting one or more service providers (820), accessing one or more geographic indicators (830), and providing a user with electronic access to a component support item based on the identified component, the selected service provider(s), and the accessed geographic indicator(s) (840). Other implementations do not select a service provider and/or do not access a geographic indicator, and, therefore, the component support item is not necessarily related to, or based on, a service provider and/or a geographic indicator.

Referring again to FIGS. 2 and 3, the system 200 and the user computer system 305, for example, can be used to implement either of the processes 700 and 800. One application involves providing customer support for a printer, by providing a print window that allows the user to receive support for the printer. In particular, when a user enters control-P at a user computer system 305 to print at an attached printer 397, a client application 378 traps the control-P entry and accesses a component identification item to obtain information on the attached printer 397 (710, 810). The client application 378 may obtain such information from, for example, an operating system or other stored data.

The client application 378, working alone or in concert with a host computer system 210, then selects a service provider (820), such as, for example, the manufacturer of the printer 397, possibly selecting from among multiple service providers (720). The user is presented with a modified print window that identifies the manufacturer and offers the user electronic access to support for the attached printer 397 (740).

A geographic indicator can be accessed (730, 830), and the provision of electronic access to a component support item can be based on the geographic indicator (840). For example, the selected service provider (in this example, the printer manufacturer) may have several locations for repair, sales, or support, and the user can be provided with a link to a location that is close to the user. The selection of the service provider can also be based on the geographic indicator. For example, an independent repair facility may be selected as a service provider (720, 820) because it is closer to the user than any of the printer manufacturer's locations.

In other applications, the link can connect the user to the host computer system 210 or to a service provider computer system 220, or may launch another routine on the user computer system 305. Applications that reside entirely on the user computer system 305 can obtain updates of support information through, for example, a communication link or a portable medium.

Figure 9:
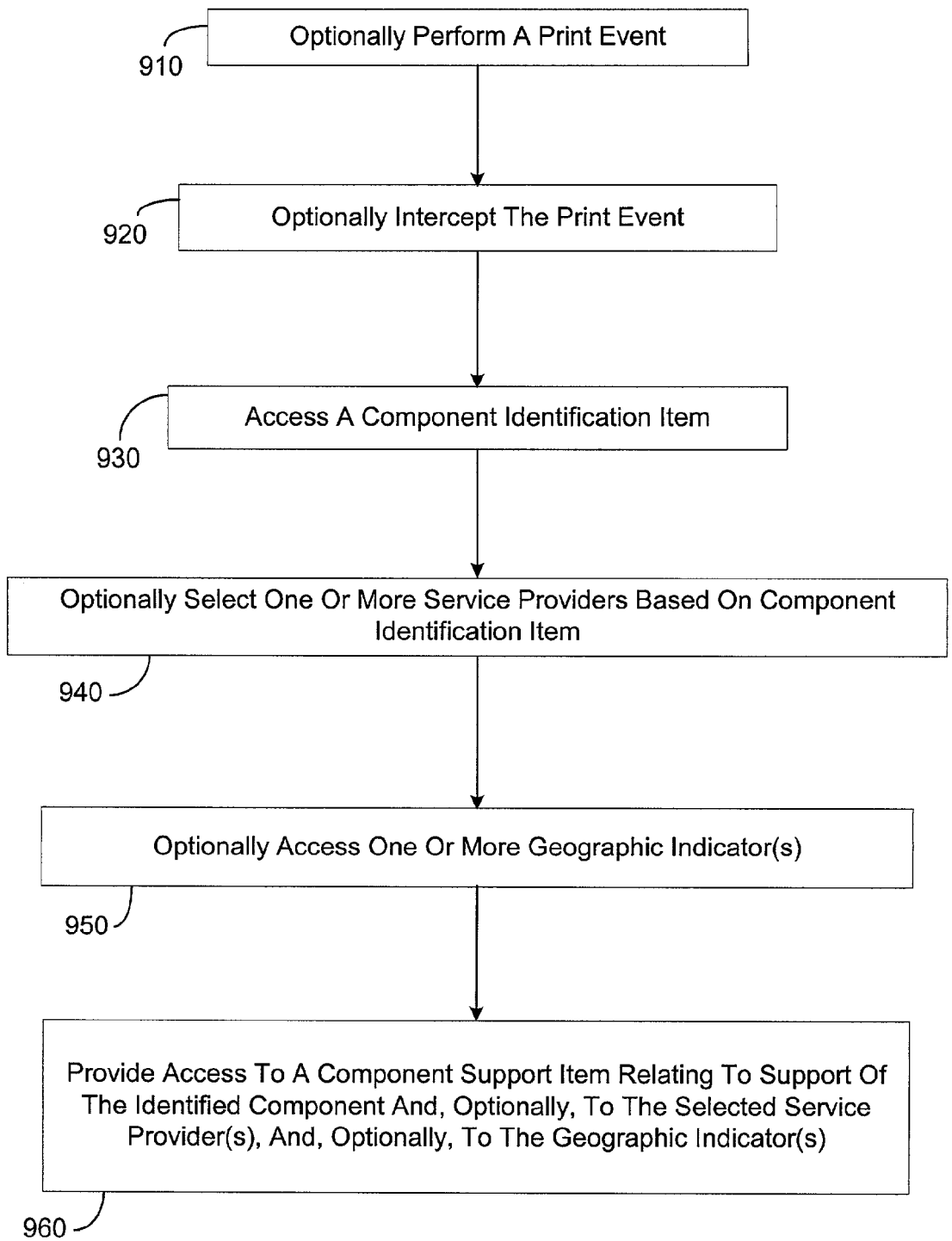

Referring to FIG. 9, a process 900 may be used to intercept the control-P event. The process 900 includes the optional performance of a print event (910), such as, for example, a user entering control-P from a keyboard or changing the default printer. The process 900 can be initiated in other ways. For example, a print button on a tool bar may be pressed with a mouse, a print menu may be pulled down and a printing option selected, or a smart system may determine that a user wants to print or needs help with printing. The smart system may base its determination on, for example, observed user actions.

A print event may or may not be intercepted (920). For instance, a system may intercept one or more control-P, or other, print events. A system may also incorporate various operations of the process 900 into the standard servicing of a print event, thus reducing or eliminating the need to intercept the print event and perform additional operations.

At least one component identification item is accessed (930). A system may perform this operation in various ways. For example, a system may issue an application program interface ("API") call to an operating system. The API call may return the name of the device driver associated with an attached printer 397. The name of the device driver, or information associated with it, may provide information about either the printer manufacturer(s) supported by the device driver or the company that produced the device driver. This information may provide or lead to an indication of what type of printer 397 is attached (930). The system can also perform a table look-up to obtain this information (930). Because device drivers often work with printers from more than one manufacturer, the system can verify the manufacturer by querying the user or, if the printer supports bidirectional communication, querying the printer (930). For instance, a system may issue API calls to get additional information related to support of the attached printer 397, such as, for example, the version number of the device driver (930). The breadth of these examples indicates that a variety of pieces of information may constitute a component identification item, including, for example, the information returned by one or more API calls, information obtained through a table look-up, or information obtained from querying or monitoring the user or the printer.

One or more service providers are optionally selected (940). A service provider may be selected based on the component identification item or other information. For example, if a manufacturer of the attached printer 397 is a potential supported service provider, then the manufacturer may be selected. Determining whether an entity, such as, for example, a manufacturer, is a potentially selected service provider may be done, for example, with a table look-up. Other possible service providers include, for example, sales centers, repair centers, and on-line service providers. One or more geographic indicators are optionally accessed (950) using, for example, one or more of the techniques described with respect to operation 440 of FIG. 4.

Access then is provided (960) to a component support item that is related to the component identified by the component identification item. The component support item may also relate to one or more service providers, if selected, and one or more geographic indicators, if accessed. A system may provide access to a component support item (960) by, for example, determining whether a new device driver is available and/or providing the user with electronic access to a newer device driver. The current version number may be determined, for example, by a table look-up of the current version number for the particular device driver, or by querying a service provider web site. The current version number may be passed by the system to a service provider computer system 220 to determine whether a newer device driver is available.

Figure 10:
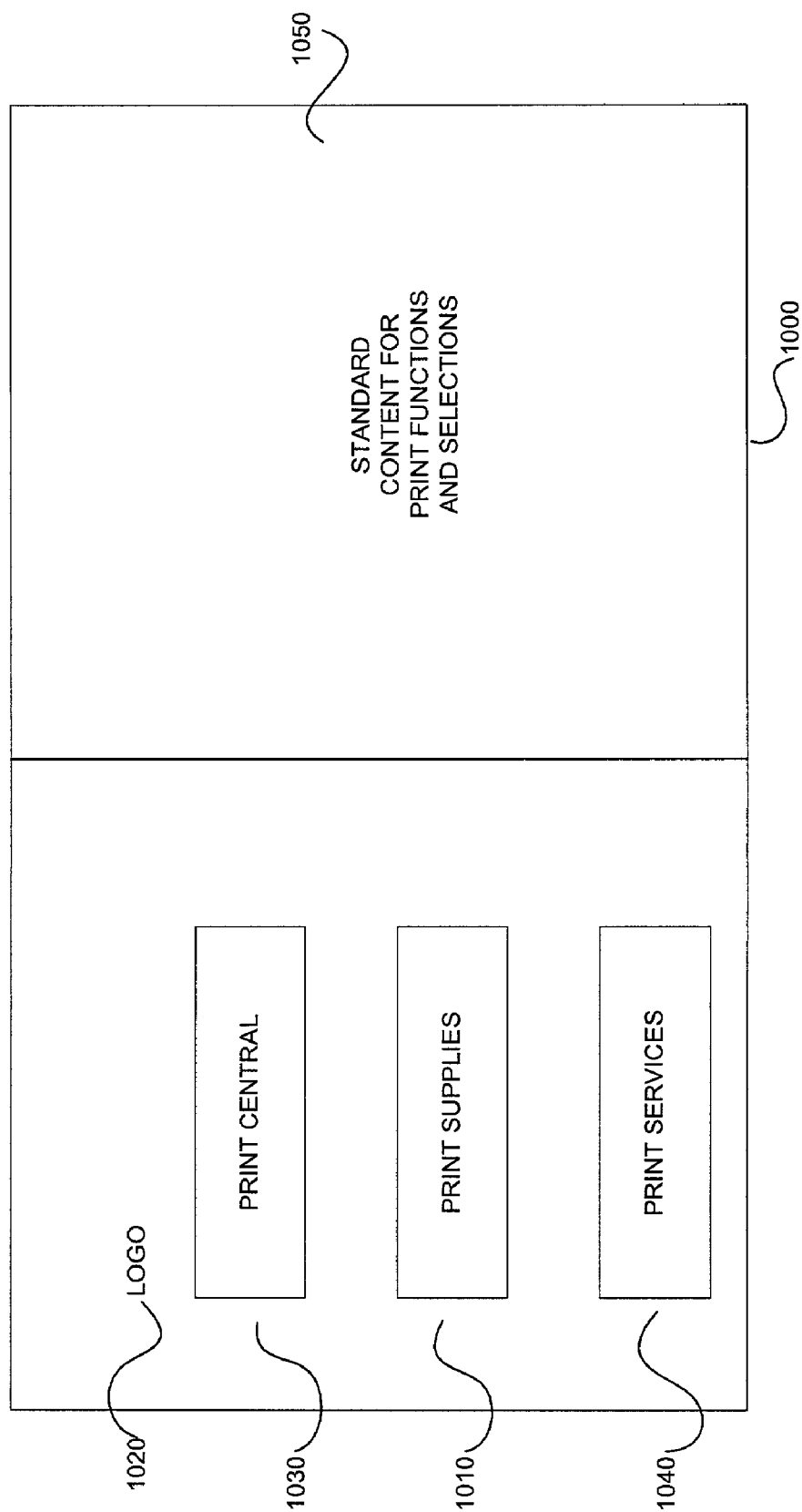
FIG. 10 is an example of a modified print window for providing access to support.

Referring to FIG. 10, in several implementations, the access to support is provided using a modified print window 1000 displayed on a client device such as described with respect to items 105, 205, and 305 of FIGS. 1, 2 and 3, respectively. The window 1000 can include a link 1010 for print supplies. The link 1010 may direct traffic to a service provider computer system 220 associated with a selected service provider (for example, the printer manufacturer). By selecting the link 1010, the service provider computer system 220 may present the user with one or more of a variety of support services (component support items), such as, for example, information on service or maintenance, answers to frequently asked questions, or information on sales. The service provider computer system 220 may be passed information about the attached printer 397, such as, for example, the manufacturer, the model number, or the version number of the device driver, or may query the user or the printer 397 to obtain needed information.

The modified window 1000 may also include a logo 1020 or other information identifying or relating to a selected service provider or to content related to the device for which support is sought, the printer in this example. Other links 1030, 1040, as well as standard content for a print screen 1050 may also be provided. The other links 1030, 1040 can provide access to additional component support items or to a variety of other information or services. In one implementation, the other links 1030, 1040 provide access to print information, such as, for example, tips and tricks, as well as print services, such as, for example, information on available on-line printing services. The links 1020, 1030, and 1040 may additionally, or alternatively, be accessed as options in a pull-down menu.

The above implementation may also interact with a host computer system such as described with respect to reference items 110 and 210 of FIGS. 1 and 2, respectively. In one implementation referencing FIG. 2, the host computer system 220 provides a user computer system 205 content for populating the modified window 1000 for display to the user. The host computer system 210, the service provider computer system 220, and the user computer system 205 may interact by leveraging software or functionality residing on one or more of these entities.

Figure 11:
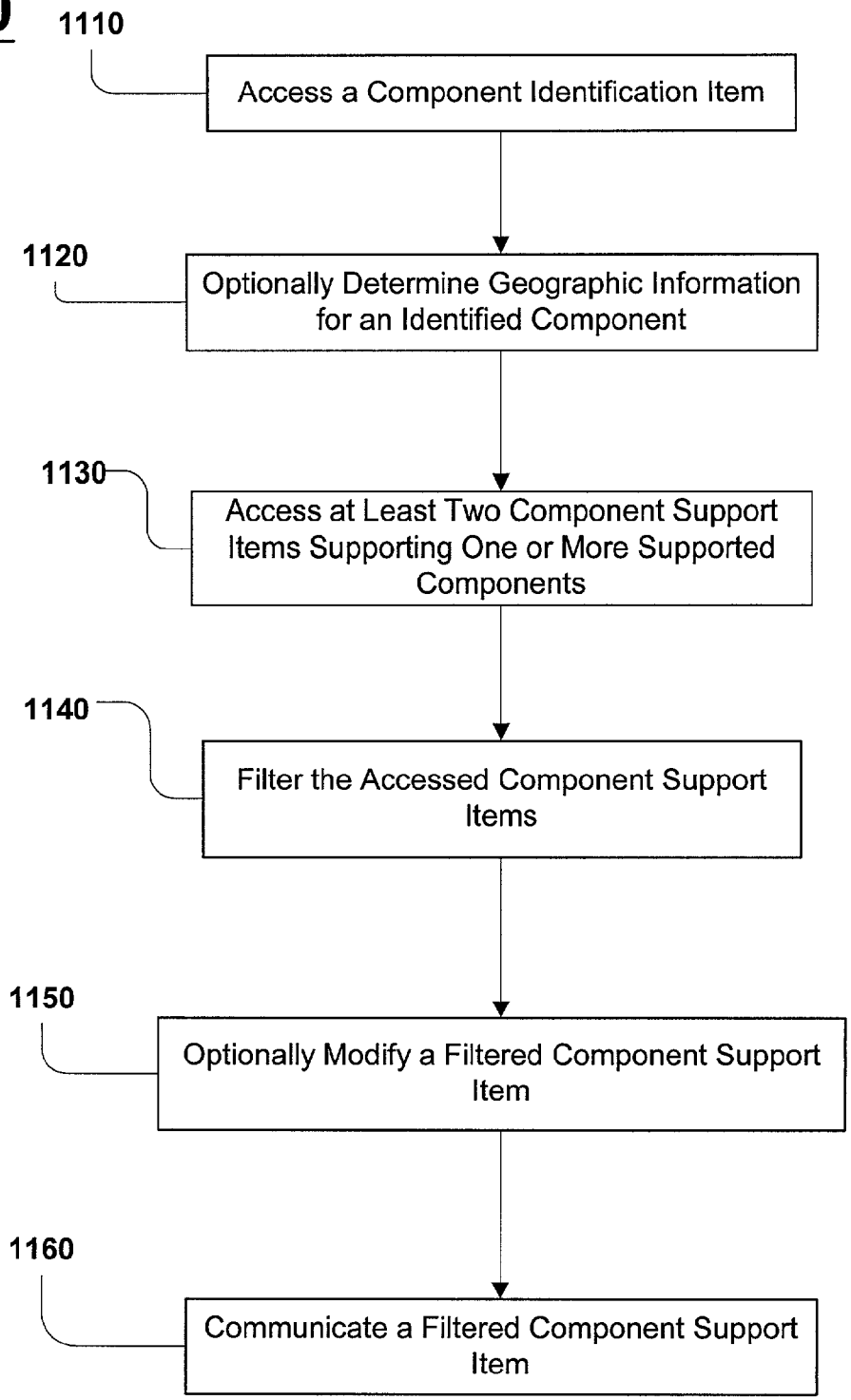
FIG. 11 is a flow chart of an example of a process that filters component support items.

FIG. 11 shows a process 1100 for filtering data accessed by a computer. The process 1100 is explained and implementations of the process are described. The process 1100 includes accessing a component identification item (1110). Geographic information for an identified component is optionally determined (1120).

At least two component support items are accessed (1130). Each of the accessed component support items includes content that supports one or more supported components, but the content in the two accessed component support items need not support the same supported component. A supported component is a component that the implementation is configured to support. A supported component can be, for example, any component produced by a supported service provider, or any component for which there is at least one component support item.

The accessed component support items are filtered (1140). The filtering of each component support item is based on a comparison of the component identified by the component identification item and the one or more supported components associated with that component support item. Filtering can involve, for example, comparing the identified component to the supported component(s) in order to determine whether the component support items support the identified component, classifying the component support items based on a comparison, and/or selecting a subset of the component support items based on a comparison.

For example, in one implementation the identified component may include a printer, and the component support items may include an advertisement and a help screen. The advertisement may include content offering an upgrade to the printer, and the help screen may include content relating to a modem. The filtering may include, for example, comparing the components (printer or modem) supported by the component support items (e.g., the advertisement and the help screens) to the identified component (printer), and selecting or blocking the component support items based on their relationship to the identified component. For instance, the advertisement may be selected because it supports the printer, and the help screen may be blocked because it does not support the printer.

One or more of the filtered component support items may be modified (1150). Modification may include, for example, adding text to the component support item to tailor it more specifically to the user or the identified component. A filtered component support item, modified or not, can be displayed or otherwise communicated to a user (1160). Communication can be achieved, for example, by displaying, by printing, by sending a message such as, for example, an electronic mail message or an instant message, or by using sound.

Referring again to FIGS. 1 and 3, the system 100 and the user computer system 305, for example, can be used to implement the process 1100. One application involves providing customer support for an attached printer 397, by providing a variety of notices (component support items) that support the printer 397. The application involves filtering multiple notices to determine if they are relevant, that is, provide support, to the printer 397. Four different examples of this application are described below.

In the first example, a host computer system 110 accesses a component identification item relating to the attached printer 397 (1110). The notices are sent to the host computer system 110, which accesses them (1130) and filters each of them (1140) before providing selected notices to the user computer system 305 for communication to the user (1160). Note that in the described examples, multiple entities may access any of the component identification items (1110) and the notices (the component support items) (1130). The host computer system 110 filters each of the component support items by determining whether each of the component support item supports the attached printer 397. This determination can be made, for example, by comparing fields of a data item that is part of, or associated with, the component support item, or by searching the component support item for text strings identifying the component that is supported. The host computer system 110 can then send the relevant component support items to the user computer system 305. The host computer system 110 can also make the relevant component support items available to the user computer system 305 by, for example, providing a pointer, or allowing the user 110 computer system 305 to access the relevant component support items.

In the second example, a host computer system 110 again accesses a component identification item relating to the attached printer 397 (1110). However, the notices are not sent to the host computer system 110, but rather, the host computer system 110 accesses them (1130) from a stored location. The host computer system 110 can then filter the notices (1140) and send selected notices to the user computer system 305 for communication to the user (1160). The host computer system 110 can also access and filter component support items other than the notices themselves, such as, for example, data fields associated with each notice.

In the third example, the user computer system 305 accesses a component identification item relating to the attached printer 397 (1110). The notices are either sent to, or made available to, the user computer system 305. The user computer system 305 then accesses (1130) and filters (1140) the notices and communicates their content to a user (1160). The notices can be sent by, for example, the host computer system 110, and the notices can be made available by, for example, storing them at the user computer system 305.

In the fourth example, either the host computer system 110 or the user computer system 305 accesses a component identification item relating to the attached printer 397 (1110) and accesses generic notices that apply to multiple components (1130) (i.e., support more than one supported component). An example of a generic notice is an advertisement from a local repair shop offering a discount on the repair of any component produced by a particular manufacturer. The computer system 110 or 305 filters the generic notice (1140) to determine that it supports the identified component. This can involve, for example, determining that the generic notice applies to all components produced by a particular manufacturer and that the identified component is produced by the particular manufacturer. This determination may include, for example, parsing the text of the notice or examining data fields associated with the notice. In various implementations, the computer system 110 or 305 then displays the notice (1160) as is, or modifies the notice (1150) to be tailored to the identified component.

Figure 12:
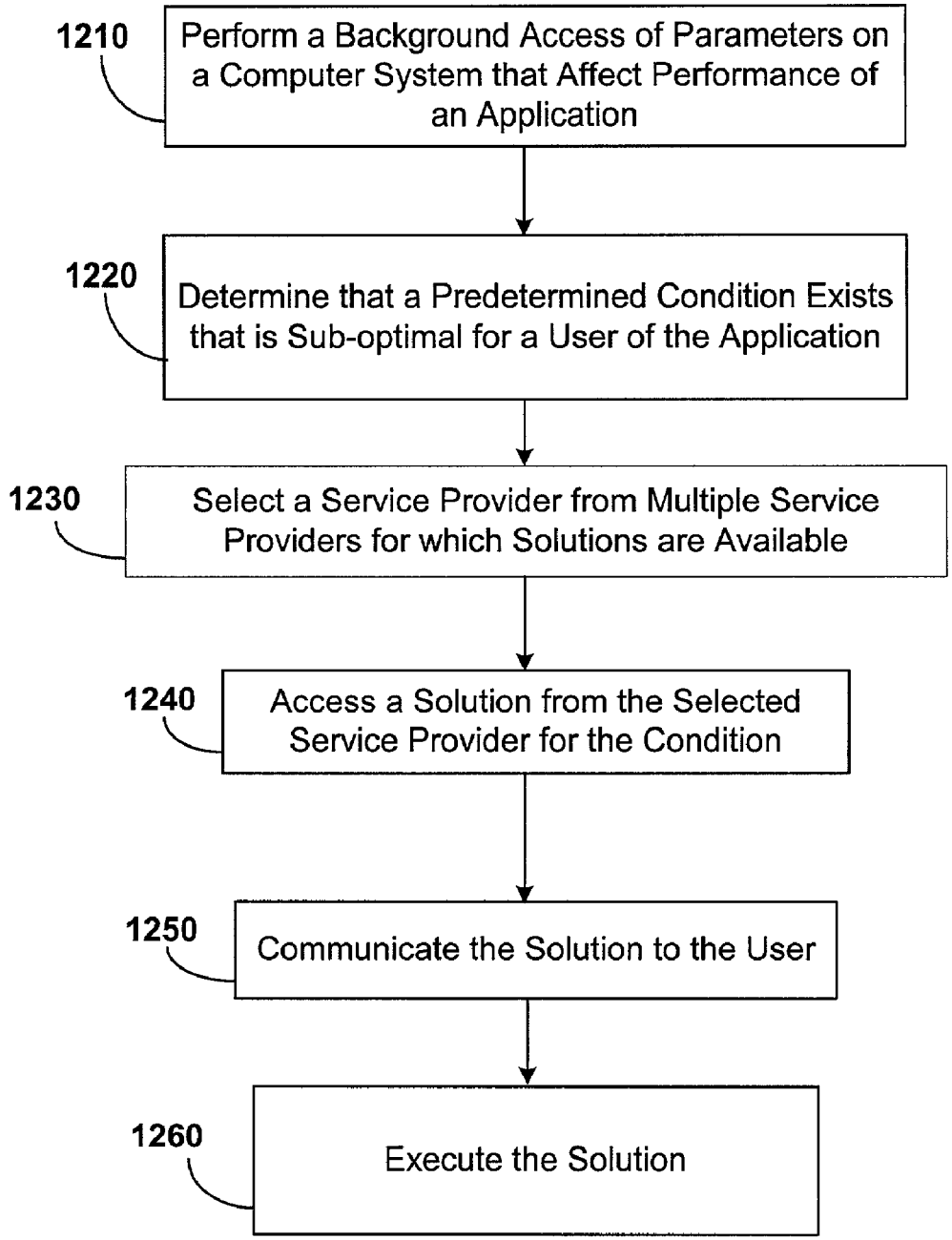
FIGS. 12 and 13 are flow charts of examples of processes that communicate to a user a solution to a predetermined condition.
Figure 13:
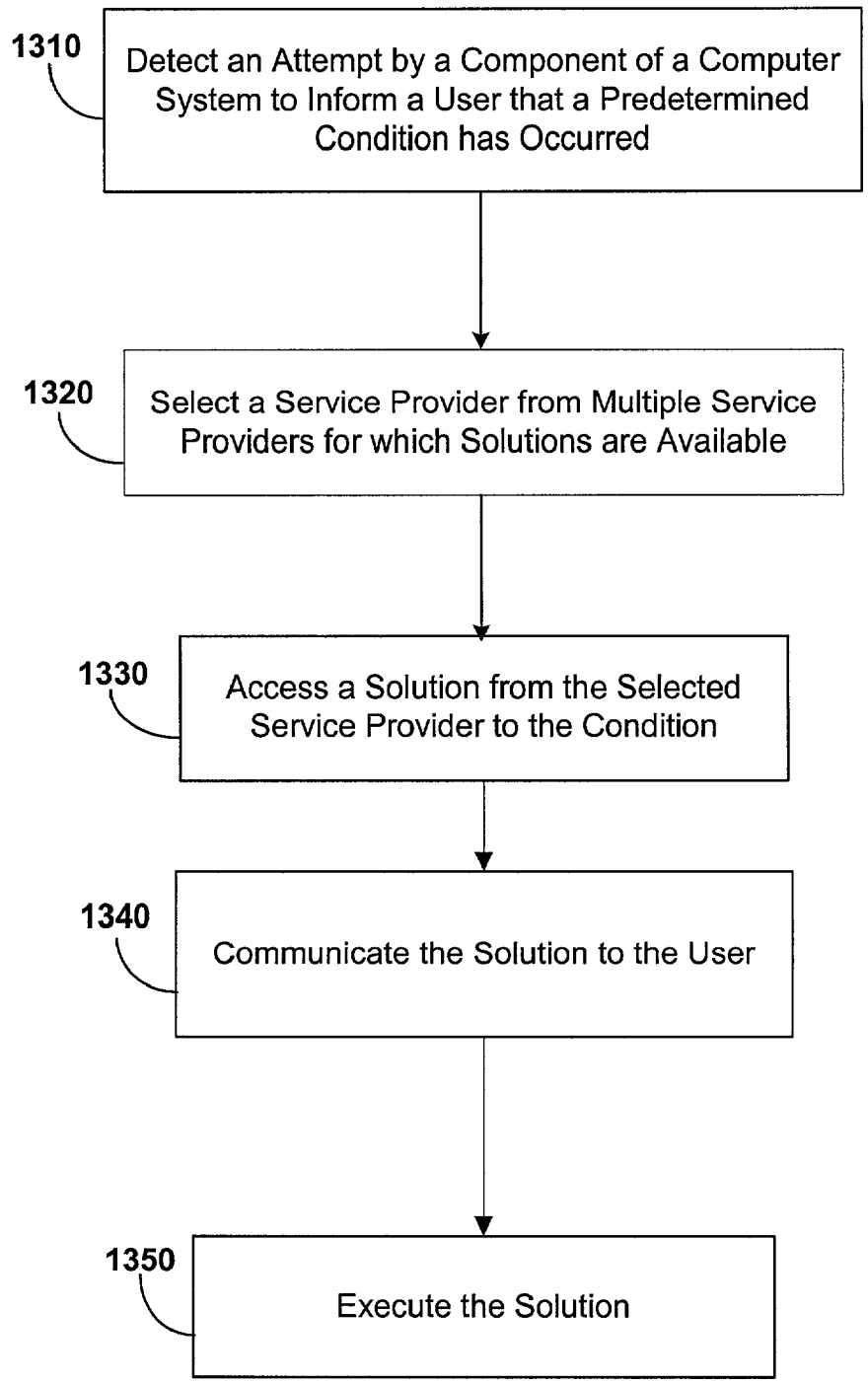

FIGS. 12 and 13 show processes 1200 and 1300 for providing solutions to a variety of conditions. The processes 1200 and 1300 are explained, and implementations of the processes are described.

Referring to FIG. 12, the process 1200 includes performing on a computer system a background access of parameters that affect performance of an application configured to run on the computer system (1210). A parameter that affects performance of an application includes, for example, an item of data that can be modified and that influences how an application operates, such as settings and configuration data, but does not include a version number of a piece of software. By performing the access in the background, as opposed to the foreground, the user does not interact with or monitor the routine that is accessing the data. Based on the accessed data, a determination is made that at least one of multiple predetermined conditions exists that is sub-optimal for a user of an application (1220). For example, the application might not be operating correctly or efficiently.

The process 1200 includes selecting a service provider from multiple service providers for which solutions are available (1230). There need not be multiple service providers offering solutions for a given existing condition, nor one service provider offering multiple solutions for the given existing condition, but, rather, the multiple service provides may include two service providers, each providing a single solution for a single, different condition. A solution from the selected service provider for the existing condition is accessed (1240) by, for example, searching a database stored locally or remotely. The computer system, possibly with the assistance of the user and other entities, may be capable of executing the solution. The solution typically addresses the condition, although it might not entirely fix the condition. The accessed solution is communicated to the user (1250) and the accessed solution is executed (1260). Implementations need not perform all of the operations in the process 1200.

Referring again to FIG. 3, the user computer system 305 can be used to implement the processes 1200. In one implementation, the client application 378 includes an auto-fix feature that searches for predetermined conditions that are sub-optimal for a user of an application. Specifically, the auto-fix feature searches for conditions that negatively impact a user's satisfaction with a dial-in information services application, such as that provided by AOL. In many situations, the auto-fix feature can detect the condition before a problem is perceived by the user.

The auto-fix feature determines that a particular sub-optimal condition exists by accessing parameters indicative of the condition. The auto-fix feature can access parameters in a variety of ways, including, for example, accessing configuration files maintained by an application or an operating system, or executing calls to an operating system. In personal computer applications in which Microsoft Windows is used, the auto-fix feature can access many parameters by searching the registry, a database distributed over one or more files that contains information and settings for all the hardware, software, users, and preferences of the computer. The registry can also contain pointers or file names, for example, that the auto-fix feature can use to access additional data.

Six examples of features included in the auto-fix feature are now discussed. Typically, as described with respect to each of these features, a user's consent is obtained before executing the solution.

First, the auto-fix feature accesses modem settings, possibly in the background (1210). When the auto-fix feature detects modem settings that will prevent the user from connecting to an online service, the auto-fix feature determines that a sub-optimal condition exists (1220). When such settings are detected, the auto-fix feature selects a service provider (1230), such as a modem manufacturer or a sales center providing support, accesses a solution (1240), such as erasing the settings, communicates the solution to the user (1250), and executes the solution (1260) after the user consents.

Second, the auto-fix feature again accesses modem settings, possibly in the background (1210). When the auto-fix feature determines that the modem is not set to operate at the modem's highest speed, the auto-fix feature determines that a sub-optimal condition exists (1220). The auto-fix feature selects a service provider (1230), such as a modem manufacturer or a sales center providing support, accesses a solution (1240), such as changing the setting to the highest speed available, communicates the solution to the user (1250), and executes the solution (1260) after the user consents.

Third, the auto-fix feature accesses, possibly in the background (1210), parameters indicating that a user is getting a busy signal or is otherwise unable to connect to an online service. When the auto-fix feature detects such a condition, the auto-fix feature determines that a sub-optimal condition exists (1220). The auto-fix feature selects a service provider (1230), such as the online service, and accesses a solution (1240). One solution involves checking the phone number(s) that are used by the modem for dialing in to the online service. Because there are typically multiple numbers that can be used to dial in to an online service, a chain of numbers can be set up and the modem can be programmed to try each number in sequence until a connection is established. The auto-fix feature can check the numbers, and either set up a chain, increase the length of an existing chain, or walk a user through a process for setting up or increasing the length of a chain. The auto-fix feature communicates the solution to the user (1250), and executes the solution (1260) after the user consents.

Fourth, the auto-fix feature accesses, possibly in the background (1210), parameters indicating that one of various temporary directories are getting full. When such a condition is detected, the auto-fix feature determines that a sub-optimal condition exists (1220). The auto-fix feature selects a service provider (1230), such as an operating system manufacturer or a browser manufacturer, accesses a solution (1240), such as deleting the contents of the directory, communicates the solution to the user (1250), and executes the solution (1260) after the user consents. This solution is useful, for example, for applications that browse the Internet and store images from web pages in a temporary directory. The temporary directory can get filled or excessively large, thereby inhibiting further storage of images, slowing access, and taking storage resources. Various events can cause the auto-fix feature to check the size of a temporary directory. For example, the auto-fix feature can check the size of the directory at periodic intervals or when the size changes due to images being stored in the directory. If a temporary directory does not have a fixed limit on its size set by the operating system, then the user can set one in the auto-fix feature.

Fifth, the auto-fix feature accesses, possibly in the background (1210), parameters indicating that an online services application is selected as one of the start-up applications. This condition is often undesirable for users that only have one phone line and that dial in using a modem on the phone line. The undesirable aspect is that the online services application will attempt to dial in when it is launched, thereby preventing the user from receiving phone calls. Therefore, when the auto-fix detects such a condition, the auto-fix feature determines that a sub-optimal condition exists (1220), selects a service provider (1230), such as the online services application or an operating system manufacturer, accesses a solution (1240), such as offering to remove the application from the start-up list, communicates the solution to the user (1250), and executes the solution (1260) after the user consents. The auto-fix feature can also be configured so that the user can inform the auto-fix feature that the user has multiple phone lines, in which case the auto-fix feature accesses the start-up list to ensure that the application is designated as a start-up application.

Sixth, the auto-fix feature accesses, possibly in the background (1210), parameters indicating that a device in a user computer system is using a device driver that is not current. The auto-fix feature determines that a sub-optimal condition exists (1220), because the device driver is not current. The auto-fix feature selects a service provider (1230), such as a manufacturer of the device or a sales center providing a support contract for the user computer system. The auto-fix feature accesses a solution (1240), such as updating the device driver, communicates the solution to the user (1250), and executes the solution (1260) after the user consents. The auto-fix feature may access information over a network from the selected service provider in order to determine that the existing device driver is not current and to update the device driver. Accordingly, selecting a service provider (1230) may be performed before determining that there is a sub-optimal condition (1220). Further, various operations of the process 1200 may be performed in different orders and/or in parallel.

The auto-fix feature can be implemented, for example, as part of the online services application or separate from it. If separate, the auto-fix feature can be implemented, for example, by the operating system or by another application.

Referring to FIG. 13, the process 1300 includes detecting an attempt by a component of a computer system to inform a user that a predetermined condition has occurred (1310). A service provider is selected from multiple service providers for which solutions are available (1320). There need not be multiple service providers offering solutions for a given predetermined condition, nor one service provider offering multiple solutions for the given predetermined condition, but, rather, the multiple service providers may include two service providers, each providing a single solution for a single, different predetermined condition. A solution to the predetermined condition is accessed (1330). The solution is communicated to the user (1340). The solution is optionally executed (1350).

Referring again to FIG. 3, the user computer system 305 can be used to implement the process 1300. In one implementation, the client application 378 includes an auto-fix feature that detects attempts to inform the user of a variety of conditions, four examples of which are discussed below. Typically, as described with respect to each of these examples, a user's consent is obtained before executing the solution.

First, the auto-fix feature detects attempts to inform a user that the user cannot connect to an online information services provider (1310). In this example, the attempts to inform the user are performed by an application or an operating system using windows to communicate with the user. The auto-fix feature in this example uses standard techniques to determine when a window is going to be displayed in a Microsoft Windows environment. The auto-fix feature then senses elements of the window construction. In particular, in this example, the auto-fix feature searches the window for particular text strings indicating that a connection has failed. After detecting (1310), the auto-fix feature selects a service provider (1320), such as the online information services provider or an operating system manufacturer, accesses a solution (1330), such as erasing or overwriting the window. For example, the auto-fix feature can overwrite the window so as to inform the user not only that the connection has failed but that the modem settings will be reset to avoid future failures with the user's consent. The auto-fix feature communicates the solution to a user (1340), and executes the solution (1350) after the user consents.

Second, the auto-fix feature detects an attempt to inform a user that an application is frozen (1310). The auto-fix feature can sense the window construction for the attempt to inform by searching for a text string indicating that an application is frozen. In applications using window codes, the auto-fix feature can alternatively sense the window code instead of focusing on the window construction. The auto-fix feature then selects a service provider (1320), such as a manufacturer for the frozen application or an operating system manufacturer, accesses a solution (1330), such as closing the application, and communicates the solution to the user (1340). The solution can be communicated, for example, by creating a window informing the user not only that the application is frozen but that the application will be closed as a solution if the user consents to it. The auto-fix feature then executes the solution (1350) after the user consents.

Third, the auto-fix feature detects an attempt to inform a user that a Java virtual machine is needed by an application and is not presently on the computer system (1310). After detecting the attempt, the auto-fix feature selects a service provider (1320), such as a manufacturer of the application, an operating system, or the Java virtual machine. The auto-fix feature accesses a solution (1330), communicates the solution to the user (1340), and executes the solution (1350) after the user consents. The auto-fix feature may communicate the solution by informing the user that a Java virtual machine is needed and can be accessed if the user inserts a particular compact diskette ("CD") or navigates to a particular web site. The auto-fix feature can execute the solution by accessing the Java virtual machine from the CD after the user inserts the CD, or by accessing the Java virtual machine from a web site.

Fourth, the auto-fix feature detects an attempt to inform a user that an attached printer is low on toner (1310). After detecting the attempt to inform, the auto-fix feature selects a service provider (1320), such as the printer manufacturer, a service center providing support for the printer, or a toner supplier. The auto-fix feature accesses a solution (1330), such as, for example, accessing a stored advertisement from a local toner supplier offering a discount on toner and other printer products, and recommending that the user buy toner using the discount. The auto-fix feature communicates the solution to the user (1340). In this example, the user must execute the solution (1350) by procuring and installing the new toner. The auto-fix feature can also inform the user of other solutions such as, for example, removing, shaking, and reinstalling the existing toner cartridge.

The above examples involve background detection of the attempts to inform, and background accessing of a solution, thus allowing the auto-fix feature to support the user while other applications are running. The auto-fix feature can detect any condition that gets reported to the user, such as, for example, error conditions and other performance-affecting conditions. The conditions can relate, for example, to an operating system or an application.

The parameters that affect performance of an application and the attempts by a component to inform a user include, in particular applications, component identification items. Further, in particular applications, the solution includes component support items, and communicating the solution includes determining a support recommendation.

Various components may be identified by parameters accessed in the process 1200. For instance, parameters such as modem settings may be used to identify the modem (a component), parameters indicating that a directory is full may be used to identify the hard disk (a component), and parameters indicating the start-up applications may be used to identify the start-up routine (a component).

Similarly, components may be identified by attempts to inform in the process 1300. For instance, an attempt to inform the user that the user cannot connect to an online information services provider may identify the online services application (a component), an attempt to inform the user that an application is frozen may identify the frozen application (a component), an attempt to inform the user that a browser needs a Java virtual machine may identify the browser (a component) and the Java virtual machine (a component), and an attempt to inform the user that a printer is low on toner may identify the printer (a component).

The processes 1200 and 1300 are further related, in particular applications, to the processes 400-900 and 1100. The operations 1210 and 1220 in the process 1200, or the operation 1310 in the process 1300, may be used to initiate one of the processes 400-900 and 1100 by identifying a need for support.

Figure 14:
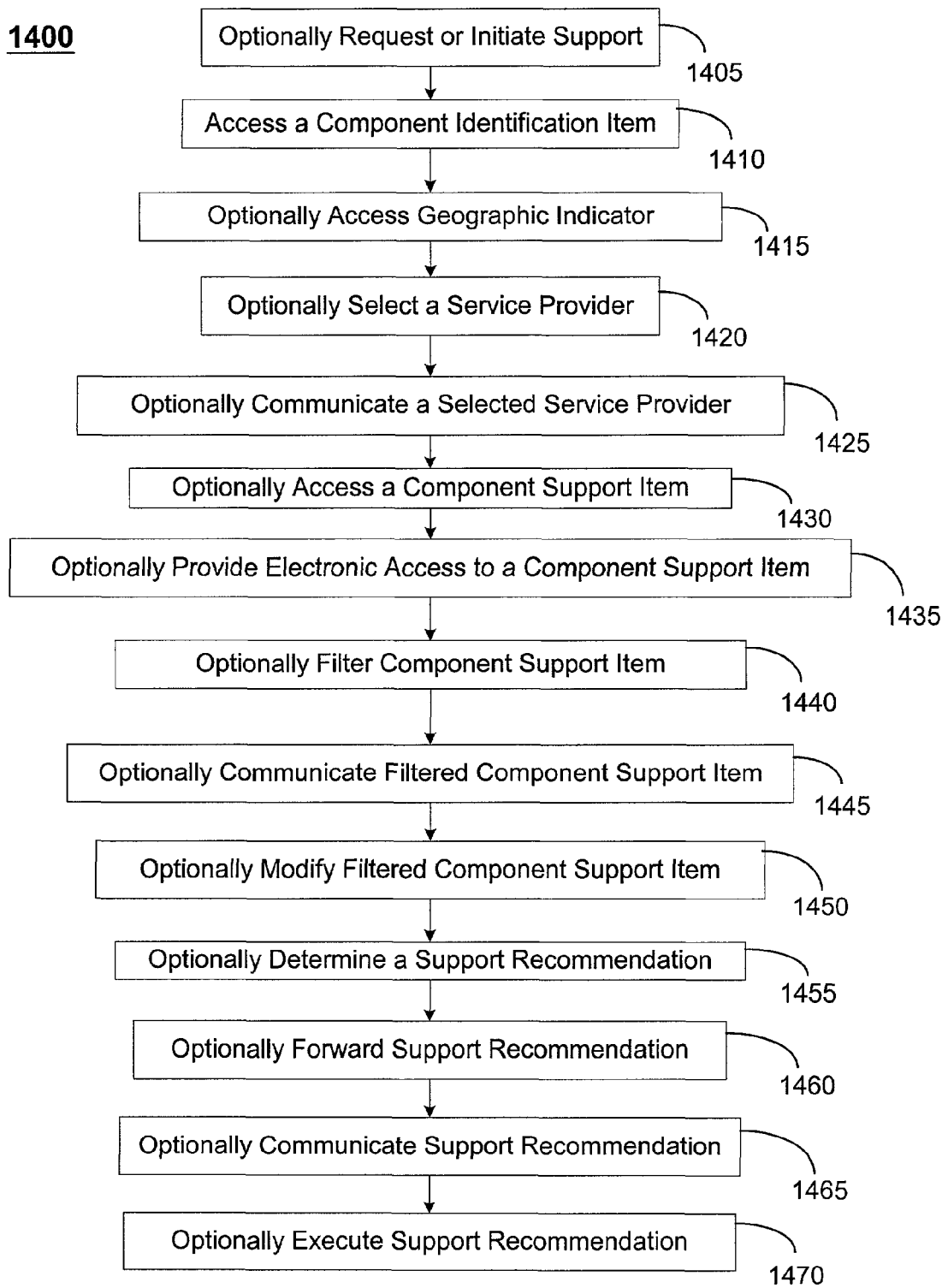
FIG. 14 is a flow chart of an example of a process that provides a variety of combinations of the operations in the processes shown in FIGS. 4-9, and others discussed below.

Referring to FIG. 14, the process 1400 provides a variety of combinations of the operations in the processes shown in FIGS. 4-9 and 11-13, and others discussed above. In general, the operations discussed in this disclosure can be combined, as either required operations or optional operations, and can be combined in different orders.

For instance, support is optionally requested or initiated (1405). A component identification item is accessed (1410). A geographic indicator is optionally accessed (1415).

A service provider is optionally selected (1420). A selected service provider is optionally communicated (1425). A component support item is optionally accessed (1430). Electronic access to a component support item is optionally provided (1435). A component support item is optionally filtered (1440). A filtered component support item is optionally communicated (1445). A filtered component support item is optionally modified (1450). A support recommendation is optionally determined (1455). A support recommendation is optionally forwarded (1460). A support recommendation is optionally communicated (1465). A support recommendation is optionally executed (1470).

Additional Implementations

For brevity, several elements in FIGS. 1-3 are represented as monolithic entities.

However, as would be understood by one skilled in the art, these elements each can include numerous interconnected computers and components designed to perform a set of specified operations and/or dedicated to a particular geographical region.

Referring again to FIG. 1, the user computer system 105 or the host computer system 110 may include one or more general-purpose computers (for example, personal computers), one or more special-purpose computers (for example, devices specifically programmed to communicate with each other and/or the user computer system 105 or the host computer system 110), or a combination of one or more general-purpose computers and one or more special-purpose computers.

The user computer system 105 or the host computer system 110 can also be of limited scope, consisting essentially of, for example, a PDA. More generally, a user computer system 105 or a host computer system 110 can consist essentially of a processor (for example, a microprocessor, a controller, or a logic device) and a storage device. Storage devices can be classified in many ways, such as, for example, permanent or temporary storage, internal or external locations, and fixed or portable. Each of these classifications and others not mentioned are encompassed by the term storage device. The processor and the storage device can be separate devices, or integrated into a single device, such as, for example, a microprocessor.

The user computer system 105 and the host computer system 110 may be arranged to operate within or in concert with one or more other systems, such as, for example, one or more local area networks ("LANs") or one or more wide area networks ("WANs"). Other implementations can also consist essentially of two user computer systems 105 or two host computer systems 110.

The user computer system 105 (or host computer system 110) can include more than one user device 120 (or host device 135) or user controller 125 (or host controller 140). The user device 120, the user controller 125, the host device 135, and the host controller 140 each typically include one or more hardware components and/or software components. An example of a user device 120 or a host device 135 is a general-purpose computer (for example, a personal computer) capable of responding to and executing instructions in a defined manner. Other examples include a special-purpose computer, a workstation, a server, a device, a component, other physical or virtual equipment or some combination thereof capable of responding to and executing instructions.

An example of user controller 125 or a host controller 140 is a software application loaded on the user device 120 or the host device 135 for commanding and directing communications enabled by the user device 120 or the host device 135. Other examples include a program, a piece of code, an instruction, a device, a computer, a computer system, or a combination thereof, for independently or collectively instructing the user device 120 or the host device 135 to interact and operate as described. The user controller 125 and the host controller 140 may be implemented permanently or temporarily in a machine, component, physical or virtual equipment, storage medium, or propagated signal capable of providing instructions to the user device 120 or the host device 135.

Each of the communication pathways 150, 155 can include, for example, a wired, a wireless, a cable, or a satellite communication pathway. A delivery network 160 includes one or more of the Internet, the world wide web, a WAN, a LAN, an analog or a digital wired or wireless telephone network (for example, PSTN, ISDN, and xDSL), a radio network, a television network, a cable network, a satellite network, and/or any other delivery mechanism for carrying data. Other implementations need not include a delivery network 160 or separate communication pathways 150, 155. One implementation couples the user computer system 105 to the host computer system 110 through a direct connection, such as, for example, a wired or a wireless connection.

Referring again to FIG. 3, one example of the communication device 384 is a modem. Other examples include a transceiver, a set-top box, a communication card, a satellite dish, an antenna, or another network adapter capable of transmitting and receiving data over a communications link. The TV tuner 386 can receive television programming in the form of, for example, broadcast, satellite, and/or cable TV signals.

Although FIG. 3 illustrates devices such as a mobile telephone 392, a PDA 393, and a TV remote control 396 as being peripheral with respect to the general-purpose computer 370, in another implementation such devices can themselves include the functionality of the general-purpose computer 370 and operate as the user device 320. For example, the mobile phone 392 or the PDA 393 can include computing and networking capabilities, and can function as a user device 320. Furthermore, the user computer system 305 can include one, some, all, or none of the components and devices described above.

A number of implementations have been described. Nevertheless, it will be understood that various modifications can be made. For example, the features described can be implemented in a process, a device, a combination of devices employing a process, or in a computer readable medium embodying instructions for such a process. The medium can be, for example, a storage device (described earlier) or electromagnetic waves encoding or transmitting instructions. Furthermore, several of the above examples are described as requiring user consent out of a respect for privacy. However, it should be understood that such consent is not technically required for implementation of these processes. In addition, user knowledge of the existence or detection of certain described conditions also is not required for operation. Accordingly, other implementations are within the scope of the following claims.

What is claimed is:

1. A method of providing service for a computer hardware component, the method comprising:

initiating a support application for a computer system;

accessing, by the initiated support application, first data indicating a condition of a hardware component of the computer system;

determining, based on the condition, that the condition is sub-optimal without human intervention;

accessing, in response to the determination that the condition is sub-optimal, second data that identifies a first manufacturer of a first type of hardware components and a second manufacturer of the first type of hardware components, the second manufacturer being different from the first manufacturer;

selecting, from the second data, the first manufacturer or the second manufacturer;

enabling display, in response to the determination that the condition is sub-optimal and to the user of the computer system, of an interface that provides service for the hardware component based on the selection of the first manufacturer or the second manufacture; and electronically executing the service for the hardware component of the computer system, wherein electronically executing the service for the hardware component of the computer system comprises downloading and installing a piece of software or modifying a configuration parameter of the hardware component of the computer system.

2. The method of claim 1, wherein enabling display of the interface comprises enabling display of a warning regarding the hardware component.

3. The method of claim 1, wherein enabling display of the interface comprises enabling display of a support recommendation for the hardware component.

4. The method of claim 1, wherein electronically executing the service for the hardware component comprises downloading and installing a piece of software.

5. The method of claim 1, wherein electronically executing the service for the hardware component comprises modifying a configuration parameter of the hardware component.

6. The method of claim 1, wherein enabling display of the interface comprises enabling display of an identifier of the selected first manufacturer or second manufacturer.

7. The method of claim 1, further comprising electronically accessing a geographic indicator indicating a location of the computer system, and wherein enabling display of the interface comprises enabling display of an interface that is tailored to the location of the computer system based on the geographic indicator.

8. The method of claim 1, wherein selecting the first manufacturer or the second manufacturer comprises:
   accessing a component identification item that identifies the hardware component, and
   selecting the first manufacturer or the second manufacturer based on information in the component identification item.

9. The method of claim 8, wherein the hardware component is a printer, and accessing the component identification item comprises deriving, at least in part, the component identification item from a filename for a device driver associated with the printer.

10. The method of claim 8, wherein accessing the component identification item comprises performing a scan of the computer system.

11. The method of claim 10, further comprising receiving pre-authorization by an owner of the computer system for performing the scan automatically.

12. The method of claim 8, wherein accessing the component identification item comprises accessing a profile of the computer system.

13. The method of claim 8, wherein accessing the component identification item comprises scanning the computer system.

14. The method of claim 8, wherein selecting the first manufacturer or the second manufacturer comprises performing a table look-up based on information in the component identification item.

15. The method of claim 8, wherein accessing the component identification item comprises issuing an application-program interface ("API") call to an operating system running on the computer system to determine a device driver file name for an active printer on the computer system.

16. The method of claim 15, wherein:
   determining that the condition is sub-optimal comprises determining that the device driver is not a current version; and
   conditioned on the determination that the condition is sub-optimal, enabling display of the interface comprises conditioned on the determination that the device driver is not a current version, enabling display of electronic access to the current version.

17. The method of claim 16, wherein determining that the device driver is not the current version comprises:
   storing electronically a current version number for the device driver;
   issuing a second API call to determine a version number of the device driver;
   comparing the device driver's version number to the current version number; and
   determining that the device driver's version number is not equal to the current version number.

18. The method of claim 8, wherein:
   the information in the component identification item comprises a potential manufacturer, and
   selecting the first manufacturer or the second manufacturer based on information in the component identification item comprises selecting the potential manufacturer as the first manufacturer or the second manufacturer.

19. The method of claim 8, wherein:
   the information in the component identification item comprises an indicator of a class of components, the class including the hardware component, and
   selecting the first manufacturer or the second manufacturer based on information in the component identification item comprises (i) using the indicator of the class to select a class manufacturer from a list of class manufacturers, and (ii) selecting the class manufacturer as the first manufacturer or the second manufacturer.

20. The method of claim 8, wherein:
   the information in the component identification item comprises an indicator of a particular manufacturer of the hardware component; and
   selecting the first manufacturer or the second manufacturer based on information in the component identification item comprises using the indicator to select the first manufacturer.

21. The method of claim 1, wherein enabling display of the interface comprises enabling display of an advertisement related to the hardware component.

22. The method of claim 21, wherein the advertisement comprises an advertisement for an upgrade of the hardware component.

23. The method of claim 21, wherein the advertisement comprises an advertisement for a warranty for the hardware component.

24. The method of claim 21, wherein the advertisement comprises an advertisement for service for the hardware component.

25. The method of claim 21, wherein the advertisement comprises an advertisement for a product related to the hardware component.

26. The method of claim 1, wherein the selected first manufacturer or second manufacturer is a manufacturer of the hardware component.

27. The method of claim 1, wherein enabling display of the interface comprises enabling display of a notice of an available upgrade.

28. The method of claim 1, wherein enabling display of the interface comprises enabling display of a software patch.

29. The method of claim 1, wherein selecting the first manufacturer or the second manufacturer comprises selecting the first manufacturer or the second manufacturer without additional input from the user.

30. The method of claim 1, wherein enabling display of the interface comprises enabling display of the interface that includes a first help option selectable by the user to receive a first type of help from the selected first manufacturer or second manufacturer and a second help option, different from the first help option, selectable by the user to receive a second type of help, different from the first type of help, from the selected first manufacturer or second manufacturer.

31. The method of claim 1, wherein enabling display of the interface that is tailored to the selected first manufacturer or second manufacturer comprises enabling display of an interface that includes information specific to the selected first manufacturer or second manufacturer 32. The method of claim 1, wherein the condition of the hardware component comprises a speed configuration of the hardware component.

33. The method of claim 1, wherein the condition of the hardware component comprises available storage of the hardware component.

34. A computer program for providing service for a computer hardware component, the computer program residing on a tangible computer-readable medium and comprising instructions for causing a computer to perform at least the following operations:
  initiate a support application for a computer system;
  access, by the initiated support application, first data indicating a condition of a hardware component of the computer system;
  determine, based on the condition, that the condition is sub-optimal without human intervention;
  access, in response to the determination that the condition is sub-optimal, second data that identifies a first manufacturer of a first type of hardware components and a second manufacturer of the first type of hardware components, the second manufacturer being different from the first manufacturer;
  select, from the second data, the first manufacturer or the second manufacturer;
  enable display, in response to the determination that the condition is sub-optimal and to the user of the computer system, of an interface that provides service for the hardware component based on the selection of the first manufacturer or the second manufacture; and
  electronically execute the service for the hardware component of the computer system, wherein electronically executing the service for the hardware component of the computer system comprises downloading and installing a piece of software or modifying a configuration parameter of the hardware component of the computer system.

35. A system for providing service for a computer hardware component, the system comprising:
  a storage device; and
  one or more processors, collectively programmed to perform at least the following operations:
  initiate a support application for a computer system;
  access, by the initiated support application, first data indicating a condition of a hardware component of the computer system;
  determine, based on the condition, that the condition is sub-optimal without human intervention;
  access, in response to the determination that the condition is sub-optimal, second data that identifies a first manufacturer of a first type of hardware components and a second manufacturer of the first type of hardware components, the second manufacturer being different from the first manufacturer;
  select, from the second data, the first manufacturer or the second manufacturer;
  enable display, in response to the determination that the condition is sub-optimal and to the user of the computer system, of an interface that provides service for the hardware component based on the selection of the first manufacturer or the second manufacture; and
  electronically execute the service for the hardware component of the computer system, wherein electronically executing the service for the hardware component of the computer system comprises downloading and installing a piece of software or modifying a configuration parameter of the hardware component of the computer system.

36. The system of claim 35, wherein one processor is programmed to perform at least the operations of receiving the indication, accessing data, selecting one of the first manufacturer and the second manufacturer, and enabling display of the interface.

* * * * *

UNITED STATES PATENT AND TRADEMARK OFFICE
CERTIFICATE OF CORRECTION

PATENT NO. : 7,742,999 B2
APPLICATION NO. : 10/134680
DATED : June 22, 2010
INVENTOR(S) : James R. Moran et al.

It is certified that error appears in the above-identified patent and that said Letters Patent is hereby corrected as shown below:

In claim 31, column 27, line 13, insert -- . -- after "second manufacturer".

In claim 34, column 27, line 43, "second manufacture" should read -- second manufacturer --.

In claim 35, column 28, line 30, "second manufacture" should read -- second manufacturer --.

Signed and Sealed this

Twenty-eighth Day of September, 2010

David J. Kappos
*Director of the United States Patent and Trademark Office*